United States Patent
Mitra et al.

(10) Patent No.: US 11,055,742 B2
(45) Date of Patent: Jul. 6, 2021

(54) AUTOMATED MECHANISMS TO RESOLVE EXPLORE-EXPLOIT DILEMMA WITH ADAPTIVE REVIVAL OPPORTUNITIES

(71) Applicant: Walmart Apollo, LLC, Bentonville, AR (US)

(72) Inventors: Abhimanyu Mitra, San Jose, CA (US); Kannan Achan, Saratoga, CA (US); Abhay Kashyap, San Francisco, CA (US); Afroza Ali, Los Altos, CA (US); Omkar Deshpande, Saratoga, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 230 days.

(21) Appl. No.: 16/263,856

(22) Filed: Jan. 31, 2019

(65) Prior Publication Data

US 2019/0236650 A1    Aug. 1, 2019

Related U.S. Application Data

(63) Continuation-in-part of application No. 15/884,173, filed on Jan. 30, 2018.

(51) Int. Cl.
*G06Q 30/00* (2012.01)
*G06Q 30/02* (2012.01)

(52) U.S. Cl.
CPC ..... *G06Q 30/0263* (2013.01); *G06Q 30/0246* (2013.01); *G06Q 30/0277* (2013.01)

(58) Field of Classification Search
CPC ........... G06Q 30/0263; G06Q 30/0246; G06Q 30/0277
See application file for complete search history.

(56) References Cited

U.S. PATENT DOCUMENTS

| 2002/0161670 | A1 | 10/2002 | Walker et al. |
| 2004/0059626 | A1 | 3/2004 | Smallwood |
| 2008/0256061 | A1* | 10/2008 | Chang ................ G06Q 30/0244 |
| 2010/0121624 | A1* | 5/2010 | Roy ..................... G06F 16/958 |
| | | | 703/6 |
| 2011/0131246 | A1 | 6/2011 | Diaz |

(Continued)

OTHER PUBLICATIONS

Johnston; Strategic Online Advertising_Modeling . . . net User Behavior with Advertising; IEEE 2006; pp. 162-167; 2006.*

(Continued)

*Primary Examiner* — Radu Andrei
(74) *Attorney, Agent, or Firm* — Bryan Cave Leighton Paisner LLP

(57) ABSTRACT

A method including displaying content elements on one or more websites to users. This method can also include tracking impression response data comprising (a) a response of the user to the content element of the content elements displayed on the one or more websites and (b) a time of the response of the user. Additionally, the method can include receiving a request from a first user. The method can further include determining weightings of the content elements based on posterior distributions using the impression response data, as adjusted by a temporal decay factor based on the times of the impression response data for the content elements. The method additionally can include generating the webpage to comprise the selected content element. Other embodiments are disclosed.

20 Claims, 8 Drawing Sheets

(56) References Cited

U.S. PATENT DOCUMENTS

| | | |
|---|---|---|
| 2011/0213655 A1 | 9/2011 | Henkin et al. |
| 2011/0302126 A1 | 12/2011 | Sekino |
| 2011/0320437 A1 | 12/2011 | Kim et al. |
| 2012/0059788 A1 | 3/2012 | Sekino |
| 2012/0143790 A1 | 6/2012 | Wang et al. |
| 2012/0177121 A1 | 7/2012 | Tripathi et al. |
| 2012/0185481 A1* | 7/2012 | Bjork ............... G06Q 30/02 707/737 |
| 2012/0303349 A1 | 11/2012 | Roy et al. |
| 2013/0080247 A1* | 3/2013 | Parsana ........... G06Q 30/0241 705/14.46 |
| 2013/0084002 A1* | 4/2013 | Bhardwaj .......... G06K 9/4652 382/165 |
| 2013/0191381 A1 | 7/2013 | Jin et al. |
| 2013/0259379 A1* | 10/2013 | Slaney ............. G06F 16/583 382/190 |
| 2013/0325857 A1 | 12/2013 | Jin et al. |
| 2014/0258277 A1 | 9/2014 | Cheng et al. |
| 2015/0278837 A1 | 10/2015 | Lahav et al. |
| 2015/0332372 A1 | 11/2015 | Hariri et al. |
| 2015/0356658 A1 | 12/2015 | Morris |
| 2015/0378578 A1 | 12/2015 | Zhang et al. |
| 2016/0210689 A1* | 7/2016 | Hummel ........... G06F 16/9577 |
| 2016/0253734 A1* | 9/2016 | Ravikant .......... G06Q 30/0629 705/26.64 |
| 2017/0061481 A1* | 3/2017 | Wee ................. G06Q 30/0201 |
| 2017/0091319 A1 | 3/2017 | Legrand et al. |
| 2017/0098236 A1 | 4/2017 | Lee et al. |
| 2017/0140053 A1* | 5/2017 | Vorobev ........... G06F 16/9535 |
| 2017/0278114 A1* | 9/2017 | Renders ........... G06Q 30/0282 |
| 2017/0308609 A1* | 10/2017 | Berkhin ............ G06F 16/282 |

OTHER PUBLICATIONS

Tate; Evaluating Adversarial Interfaces_An Automated Approach; IEEE 2016; pp. 56-68; 2016.*

* cited by examiner

AUTOMATED MECHANISMS TO RESOLVE EXPLORE-EXPLOIT DILEMMA WITH ADAPTIVE REVIVAL OPPORTUNITIES

CROSS-REFERENCE TO RELATED APPLICATIONS

This application is a continuation-in-part of U.S. application Ser. No. 15/884,173, filed Jan. 30, 2018. U.S. application Ser. No. 15/884,173 is incorporated herein by reference in its entirety.

TECHNICAL FIELD

This disclosure relates generally to automated decision engines, and relates more particularly to automatic resolution of the explore-exploit decision.

BACKGROUND

Many websites display content that is regularly changing. Moreover, there is a choice between exploiting content that is known to be effective and exploring new content to learn its effectiveness. The explore-exploit choice is compounded when considering seasonality, personalization to users and/or the context of the users in omnichannel settings.

BRIEF DESCRIPTION OF THE DRAWINGS

To facilitate further description of the embodiments, the following drawings are provided in which.

Figure 1:
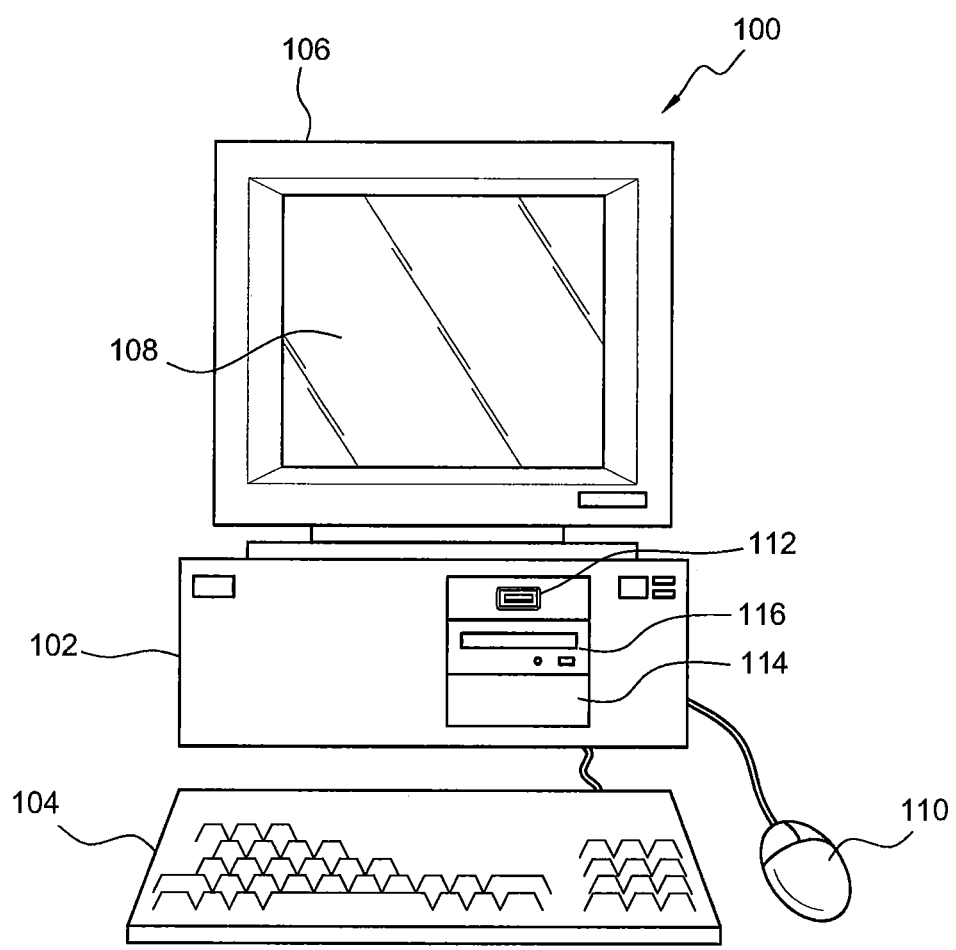
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Figure 2:
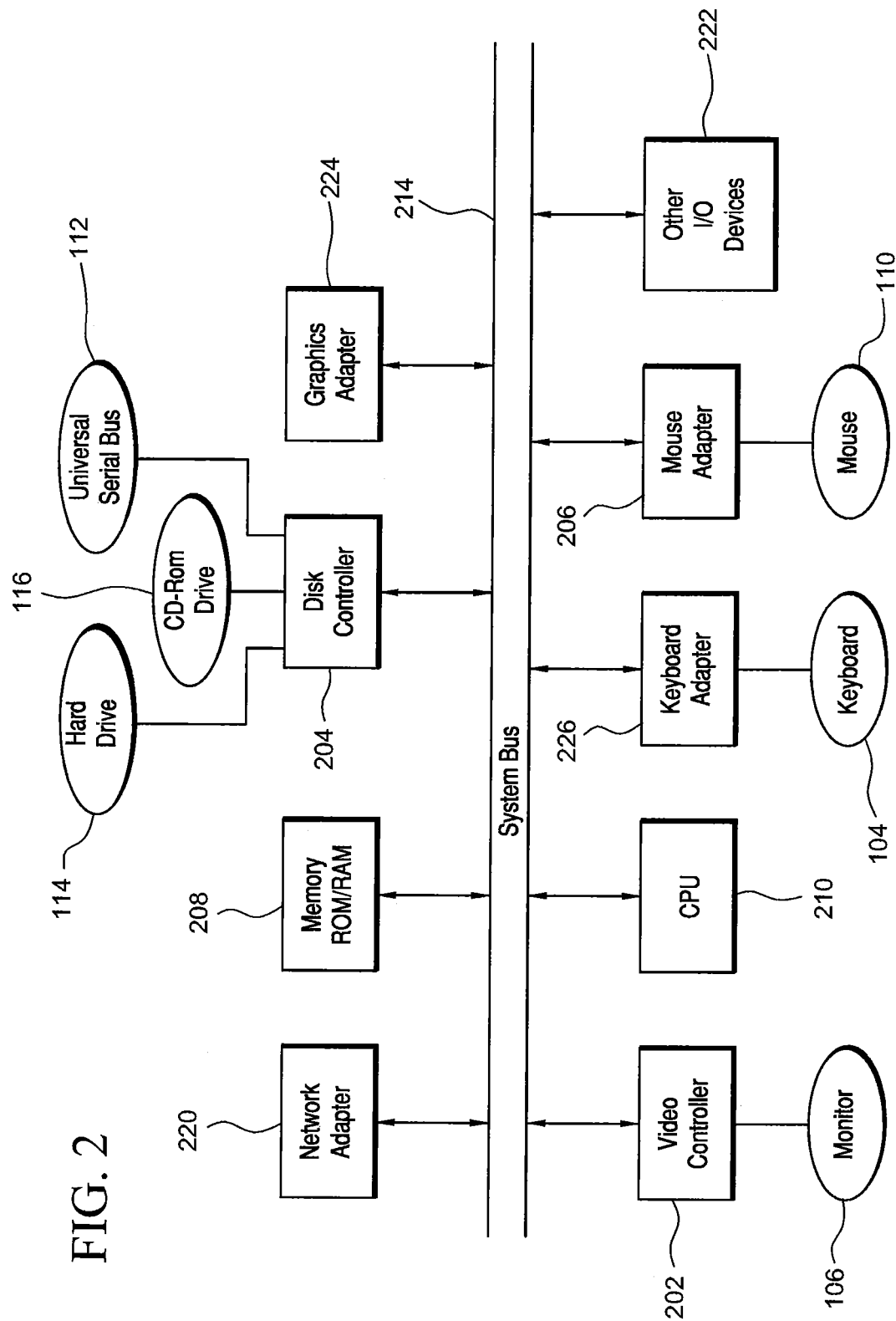
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can includes one or more of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 100) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
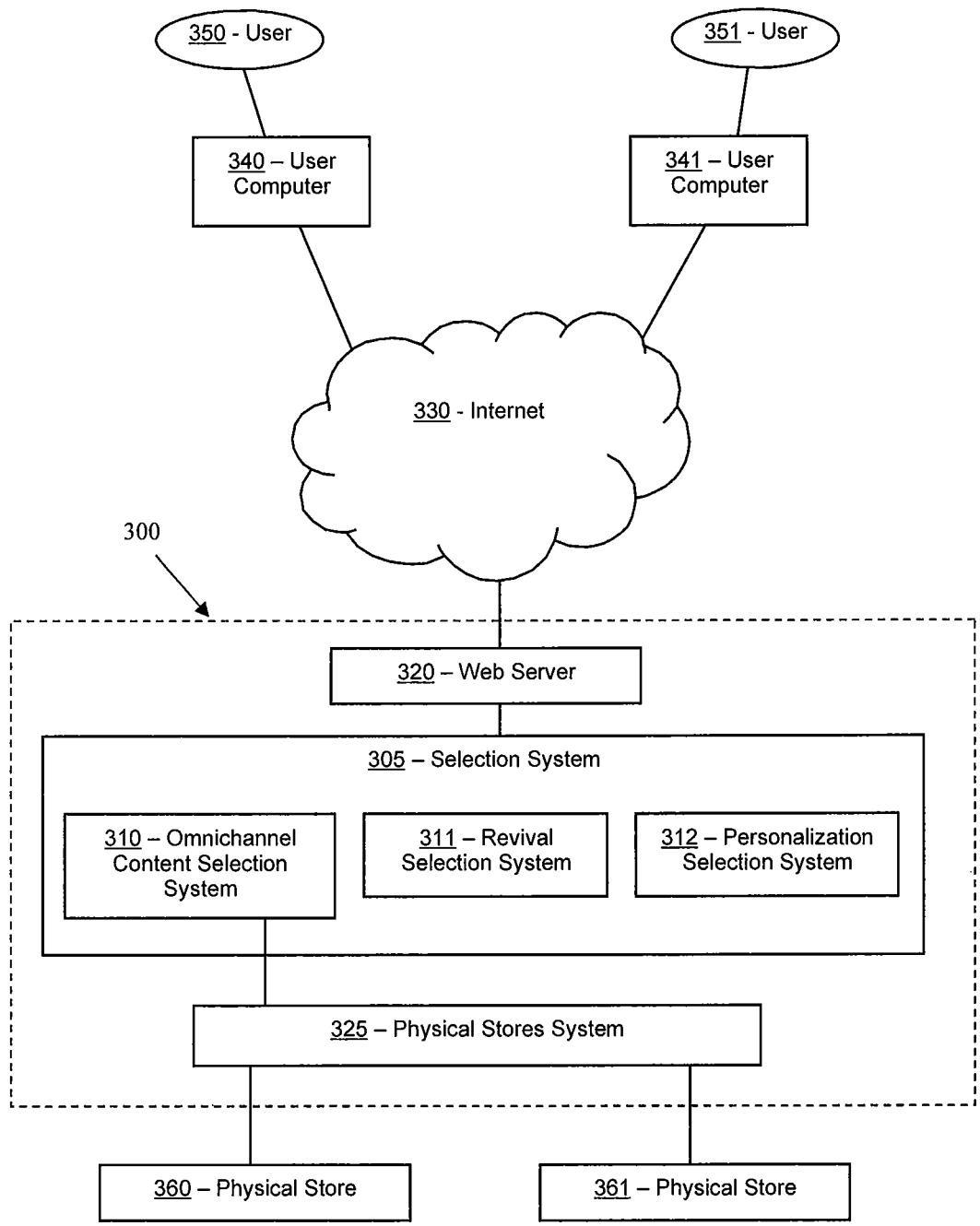
FIG. 3 illustrates a block diagram of a system that can be employed for automatic resolution of the explore-exploit decision in omnichannel settings, with revival, and/or with personalization using dynamically shared learnings, according to an embodiment.

Turning ahead in the drawings, FIG. 3 illustrates a block diagram of a system 300 that can be employed for automatic resolution of the explore-exploit decision in omnichannel settings, with revival, and/or with personalization using dynamically shared learnings, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. In some embodiments, system 300 can include a selection system 305, a web server 320, and/or a physical stores system 325.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In a number of embodiments, selection system 305 can include an omnichannel content selection system 310, a revival selection system 311, and/or a personalization selection system 312. Selection system 305, web server 320, and/or physical stores system 325 can each be a computer system, such as computer system 100 (FIG. 1), as described above, and can each be a single computer, a single server, or a cluster or collection of computers or servers, or a cloud of computers or servers. In another embodiment, a single computer system can host selection system 305, web server 320, and/or physical stores system 325. In a number of embodiments, omnichannel content selection system 310, revival selection system 311, and/or personalization selection system 312 can each be a computer system, such as computer system 100 (FIG. 1), as described above, and can each be a single computer, a single server, or a cluster or collection of computers or servers, or a cloud of computers or servers. In another embodiment, a single computer system can host selection system 305, omnichannel content selection system 310, revival selection system 311, and/or personalization selection system 312. Additional details regarding selection system 305 omnichannel content selection system 310, revival selection system 311, personalization selection system 312, web server 320, and/or physical stores system 325 are described herein.

In some embodiments, selection system 305 can include omnichannel content selection system 310 without including revival selection system 311 or personalization selection system 312. In other embodiments, selection system 305 can include revival selection system 311 without including omnichannel content selection system 310 or personalization selection system 312. In another embodiment, system selection 305 can include personalization selection system 312 without including omnichannel content selection system 310 or revival selection system 311. In further embodiments, selection system 305 can include omnichannel content selection system 310 and revival selection system 311 without including personalization selection system 312. In still other embodiments, selection system 305 can include omnichannel content selection system 310 and personalization selection system 312 without including revival system 311. In yet other embodiments, selection system 305 can include revival selection system 311 and personalization selection system 312 without including omnichannel content selection system 310. In some embodiments, selection system 305 can include omnichannel content selection system 310, revival selection system 311, and personalization selection system 312.

In some embodiments, web server 320 can be in data communication through Internet 330 with one or more user computers, such as user computers 340 and/or 341. In some embodiments, user computers 340-341 can be used by users, such as users 350 and 351, which also can be referred to as customers, in which case, user computers 340 and 341 can be referred to as customer computers. In many embodiments, web server 320 can host one or more websites. For example, web server 320 can host a website that allows users to browse and/or search for items (e.g., products), to add items to an electronic cart, and/or to purchase items, in addition to other suitable activities.

In a number of embodiments, physical stores system 325 can be in data communication with selection system 305 and/or omnichannel content selection system 310, and selection system 305 can be in data communication with web server 320. In several embodiments, physical stores system 325 can be in data communication with the point-of-sale systems in physical stores, such as physical store 360 and/or physical store 361. In many embodiments, physical stores 360-361 each can be a physical store, such as a brick-and-mortar store, that is associated (e.g., operated by a common business entity or entities under common control) with the website hosted by web server 320. In many embodiments, many of the items sold at the physical stores (e.g., 360-361) can be the same as the items sold on the website. In some embodiments, physical stores system 325 can be a distributed system that includes one or more systems in each of the physical stores (e.g., 360-361). In other embodiments, physical stores system 325 can be a centralized system that communicates with systems in the physical stores (e.g., 360-361). In several embodiments, physical stores system 325 can track purchases made by users (e.g., 350-351) in the physical stores (e.g., 360-361).

In a number of embodiments, omnichannel content selection system 310 and/or physical stores system 325 can link transactions made by a user (e.g., 350-351) at one or more physical stores (e.g., 360-361) to each other and can link these transactions to transactions and/or other activity by the user on the website hosted by web server 320. These linkages can be done based on the payment information provided by the user at the one or more physical stores and on the website, such as the credit card information used.

In many embodiments, an internal network that is not open to the public can be used for communications between omnichannel content selection system 310, revival selection system 311, and/or personalization selection system 312 within selection system 305. In some embodiments, the same or another internal network can be used for communications between omnichannel content selection system 310 and/or physical stores system 325. In several embodiments, the same or another internal network can be used for communications between selection system 305 (and element thereof), web server 320, and/or physical stores system 325 within system 300. Accordingly, in some embodiments, selection system 305 (and elements thereof) and/or physical stores system 325 (and/or the software used by such systems) can refer to a back end of system 300 operated by an operator and/or administrator of system 300, and web server 320 (and/or the software used by such systems) can refer to a front end of system 300, as is can be accessed and/or used by one or more users, such as users 350-351, using user computers 340-341, respectively. In these or other embodiments, the operator and/or administrator of system 300 can manage system 300, the processor(s) of system 300, and/or the memory storage unit(s) of system 300 using the input device(s) and/or display device(s) of system 300.

In certain embodiments, user computers 340-341 can be desktop computers, laptop computers, a mobile device, and/or other endpoint devices used by one or more users 350 and 351, respectively. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can include a mobile device, and vice versa. However, a wearable user computer device does not necessarily include a mobile device, and vice versa.

In specific examples, a wearable user computer device can include a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can include (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can include the Virtual Retinal Display™ product, or similar product by the University of Washington of Seattle, Wash., United States of America. Meanwhile, in further specific examples, a limb mountable wearable user computer device can include the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, selection system 305, omnichannel content selection system 310, revival selection system 311, personalization selection system 312, web server 320, and/or physical stores system 325 can each include one or more input devices (e.g., one or more keyboards, one or more keypads, one or more pointing devices such as a computer mouse or computer mice, one or more touchscreen displays, a microphone, etc.), and/or can each include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to selection system 305, omnichannel content selection system 310, revival selection system 311, personalization selection system 312, web server 320, and/or physical stores system 325 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of selection system 305, omnichannel content selection system 310, revival selection system 311, personalization selection system 312, web server 320, and/or physical stores system 325. In a similar manner, the processors and/or the non-transitory computer-readable media can be local and/or remote to each other.

Meanwhile, in many embodiments, selection system 305, omnichannel content selection system 310, revival selection system 311, personalization selection system 312, web server 320, and/or physical stores system 325 also can be configured to communicate with one or more databases. The one or more databases can include a product database that contains information about products, items, or SKUs (stock keeping units), for example. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between selection system 305, omnichannel content selection system 310, revival selection system 311, personalization selection system 312, web server 320, physical stores system 325, and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, one or more of the webpages displayed by the website hosted by web server 320 can include one or more content elements. In some embodiments, these content elements can include information about one or more items that are available on the website. For example, a webpage can include a content element that includes links to item pages for three separate items. In many embodiments, these items can be featured and/or promoted items. In some embodiments, the items can be displayed sequentially, such as displaying one at a time in a three-part cycle of three items, or displaying five items at a time in a three-part cycle of fifteen items. These content elements are sometimes referred to as item modules and/or carousels. Conventionally, these content elements are designed by merchants, and there are many possible content elements from which to select when displaying one or more content elements on a webpage of the website. In some conventional approaches, content elements have been generated based on the past purchases of items by a user (e.g., 350-351) to facilitate easy reorder (ERO) of these items. In some such cases, the items in a content element designed for ERO that are displayed to the user (e.g., 350-351) on the website can include items that were purchased by the user in physical stores (e.g., 360-361).

Selecting a content element from among a group of content elements can present the explore-exploit dilemma, particularly when the content elements are regularly changing. Specifically, there is a choice between exploiting content elements that are known to be effective and exploring new content elements to learn their effectiveness. The "exploit" option in the explore-exploit dilemma arises when certain content elements are known, based on past experience, to be effective at achieving an objective. Examples of the objective can be increasing conversions (e.g., purchases) based on the display of the content element or increasing click-through-rates based on the display of the content element. Based on showing content elements in the past, it can be determined that certain content elements are more effective at achieving an objective than other content elements. To increase conversions associated with a webpage (e.g., the homepage) of a website hosted by web server 320, for example, system 300 can decide to display content element that have produced high conversion rates in the past. Exploiting these content elements that are known to be effective can provide customer satisfaction and can further business objectives.

By contrast, the "explore" option in the explore-exploit dilemma arises when a new content element is available for selection to be displayed on the website and information about its effectiveness at achieving the objection would be enhanced by displaying the content element and collecting feedback. Without testing a new content element on the website, system 300 lacks the data to decide whether the content element should be exploited. As new content elements can be added regularly, due to new items, changing market demands, or different business priorities, for example, there can be a lack of sufficient data as to whether these new content elements are effective and should be exploited. Exploring these new content elements can facilitate discovering which new content elements are effective, so that content elements that are found to be effective can be exploited.

Contextual explore-exploit can add an additional layer of complexity, in which the approach to resolving the explore-exploit dilemma can depend on the context. For example, the context could be the user (e.g., 350-351), in which case the approach to resolving the explore-exploit dilemma can be to adapt according to one or more characteristics of the user. Another example of the explore-exploit dilemma appears in deciding recommended items in recommendation modules in item pages. For example, an item page can feature an item, and describe the item. This item can be called the anchor item for the item page. The item page also can include additional items that can be recommended. Selection of these recommended items can involve the explore-exploit dilemma. Continuous exploration arises here because new items, and new content elements, are regularly added to the website.

Sometimes, a business group that operates a website, such as the website hosted by web server 320, also operates physical stores, such as physical stores 360-361. Such an arrangement presents the possibility of users interacting in either or both of these channels. For example, the first channel can be the physical stores (e.g., 360-361), which is also referred to as "offline," or "store," and the second channel can be the website, which is also referred to as "online." In an omnichannel setting, there can be many different objectives, such as considering if the content elements on the homepage focus on driving online conversion or instead focus on driving offline conversion. Conventional approaches to resolve the explore-exploit dilemma often ignore the offline conversion option. Yet many users (e.g., 350-351) visit the web site to view information about items, without purchasing the items through the website, and then go to physical stores (e.g., 360-361) to purchase the items viewed on the website. Moreover, certain items are more typically purchased in physical stores, such as grocery items, for example, and other items are more typically purchased online, such as electronics, for example.

In many embodiments, system 300 can provide an automated approach to resolving the explore-exploit dilemma in the omnichannel setting and based on the context of the user. For example, if a user (e.g., 350-351) that typically purchases items through the physical stores (e.g., 360-361) visits the website, the user can be more likely to see content elements designed to drive conversion in the physical stores. On the other hand, a user (e.g., 350-351) that typically purchases items online can be more likely to see content elements suited to drive online conversion in the website.

Considering the omnichannel setting in resolving the explore-exploit dilemma can add additional considerations, such as deciding when exploiting should be done for each objective, and deciding how to target different objectives for different contexts when deciding to exploit. The omnichannel setting in the explore-exploit dilemma brings in a complexity in the modeling that cannot be resolved by treating it as a contextual-only explore-exploit dilemma. In a contextual explore-exploit, given the context, the dilemma is choosing only whether to explore or to exploit. In an omnichannel setting, by contrast, the dilemma involves further deciding which channel to focus on when exploiting.

As described above, conventional approaches generally ignore the differences in responses in the different channels. But approaches that involve consolidation or summarization of metrics across the channels when deciding to exploit, such as by adding up the conversion rates from the physical stores and the website, and then exploiting based on the total conversion rate, lead to sub-optimal exploiting behavior from the model, as illustrated in the following example.

Consider a user $U_1$ who usually purchases through the physical stores and is known, through past performance data, to be impacted by an offline-catered content element $C_{off}$ with conversion rate of 1% offline with volatility 0.01%, but has a 0.2% conversion rate online with volatility 0.14%. User $U_1$ also is known to be impacted by an online-catered content element $C_{on}$ with a conversion rate of 0.6% offline with volatility 0.1%, and 0.6% conversion rate online with volatility 0.1%. Adding up the conversion rates for user $U_1$ would result in $C_{on}$ and $C_{off}$ being almost equivalent, having almost equal means and volatility of total conversion rates. Using this summarized information in an explore-exploit mechanism would result in deciding that these two content elements $C_{on}$ and $C_{off}$ are equivalent for user $U_1$, and would result in treating these content elements in the same way. However, using the more granular information can result in exploiting $C_{off}$ more often for user $U_1$, as there is a higher conversion rate of 1% with a low volatility of 0.01%. This approach of using channel-specific past-performance data can result in a more robust approach to resolve the explore-exploit dilemma. In many embodiments, system 300 beneficially can implement this more robust approach by selecting content elements that consider both the context and the channel setting in resolving the explore-exploit dilemma.

In many embodiments, system 300 can provide an automated approach to resolving the explore-exploit dilemma with revival. Conventional approaches typically involve a static environment that generally ignores changing preferences in an evolving environment. In a static environment, user preferences for content elements are assumed to not change over time. In a dynamic environment, content element preferences of users can evolve over time for multiple reasons, such as seasonality, changes in website traffic, or changes in popularity of content. For example, a content element featuring one or more Halloween costumes can generate interest from mid-to-end of the month in October. The same Halloween costumes can generate little interest in other months of the year due to seasonality. Another example of an evolving environment can include a change in website traffic composition, such as the demographics of the users of the website. For example, users of the website could have historically consisted primarily of customers of one generation who disliked a particular type of content element, yet this particular type of content element can be popular with users of another generation that have recently become a significant portion of the total users of the website. Due to such changing preferences, when a particular content element is found to not generate interest (e.g., is unpopular) on a website, the tracked data for that content element showing low interest can be temporary and not permanent.

From time-to-time, tracked data for content elements can be re-explored to validate prior data and learnings to revive content elements that are no longer displayed (e.g., retired) due to not generating enough interest to be displayed on one or more websites. In many embodiments, system 300 beneficially can implement this more robust approach by selecting content elements that consider an evolving environment and reviving content elements temporarily retired due to seasonality, website traffic changes, or changing generational preferences in resolving the explore-exploit dilemma.

In many embodiments, system 300 can provide an automated approach to resolving the explore-exploit dilemma with personalization using dynamically shared learnings. Conventional approaches generally involve imposing popular preferences to each possible context on everyone by a fast learning model used in contextual learning. Generally, a fast learning model typically aggregates users (e.g., individual contexts) into a single group of users in order to draw fast and generalized conclusions regarding user preferences (e.g., context), among other things. Although the speed in drawing generalized conclusions can result in fast data ready to be analyzed for a period of time, the generalized conclusions sometimes do not reflect the specific preferences of the user (e.g., the preferences of a specific user for specific content) when the context preferences of one or more users differ from the popular preferences of other users.

In a more-customized learning model, data collected typically contains more granular information of users to delineate specific preferences from popular preferences of users and to separate the preferences of the majority of users in the group (e.g., popular preferences) from the others. Generally, a customized learning model uses data that can be more granular (e.g., detailed), which can yield an inverse effect where the speed of learning for each possible context in contextual learning can be decreased proportionally to the increase in the granularity of the data used. Although the customized learning model can more accurately reflect the specific preferences of each user of a group of users for each piece of content in a given time period, in many embodiments, a balance of users and content preferences can provide a more useful combination used in the customized learning model approach. In several embodiments, in the customized learning model, the balance of users can be grouped by individual instances to form segments. By using segments, the customized learning model can yield conclusions that can be drawn fast enough to be relevant and can also derive popular preferences however, the popular preferences may not be applied and/or imposed on each user in the entire group of users. By not applying and/or imposing the popular preferences on each user, the customized learning model can avoid excluding those users with preferences that fall outside the bounds of the generalized popular preferences.

In some embodiments, in leaning toward a more-customized learning model in contextual learning using individual users or a group of aggregated users can result in a tradeoff with a decrease in the speed of the learning process in order to gain customized user content preferences. In a dynamic world setting, users grouped by individual instances to form segments would be further formed into a pool of segments used in the customized learning model for contextual learning. Faster contextual learning in the dynamic work setting can handle a content pool and a pool of segments constantly changing and evolving over time. In a number of embodiments, applying popular content preferences can be advantageous for some but not all of the segments (e.g., sets of grouped users). For example, in a huge segment pool, it can be likely that some segments in the huge segment pool can have similar content preferences. Based on this intuition, in some embodiments, an approach can be used for faster learning in the contextual learning model in which some of the segments with similar content preferences share learnings with each other to compensate and/or resolve potential slower customized learning occurring in some segments of the pool of segments for contextual learning.

Figure 4:
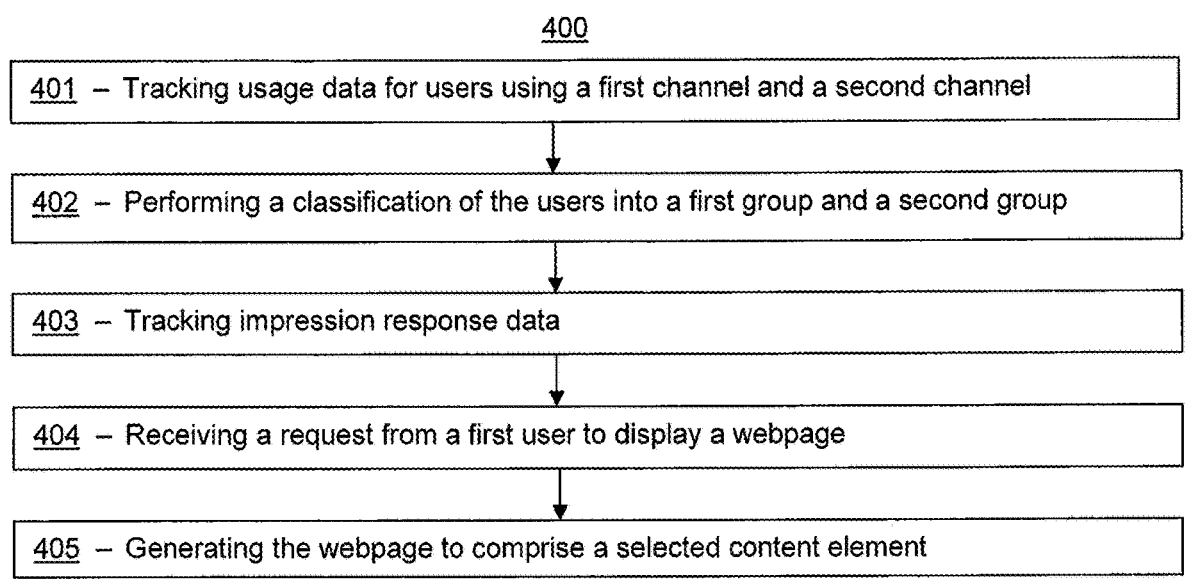
FIG. 4 illustrates a flow chart for a method, according to another embodiment.

Turning ahead in the drawings, FIG. 4 illustrates a flow chart for a method 400. In some embodiments, method 400 can be a method of automatic resolution of the explore-exploit decision in omnichannel settings. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped.

In many embodiments, system 300 (FIG. 3), selection system 305 (FIG. 3), and/or omnichannel content selection system 310 (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of a computer system such as selection system 305 (FIG. 3), web server 320 (FIG. 3), and/or physical stores system 325 (FIG. 3). The processor(s) can be similar or identical to the processor(s) described above with respect to computer system 100 (FIG. 1).

In some embodiments, method 400 and other blocks in method 400 can include using a distributed network including distributed memory architecture to perform the associated activity. This distributed architecture can reduce the impact on the network and system resources to reduce congestion in bottlenecks while still allowing data to be accessible from a central location.

Referring to FIG. 4, method 400 can include a block 401 of tracking usage data for users using a first channel and a second channel. The users can be similar or identical to users 340-341 (FIG. 3). In many embodiments, the first channel can be one or more physical stores associated with a website, and the second channel can be the website. The physical stores can be similar or identical to physical stores 360-361 (FIG. 3). The website can be similar or identical to the website hosted by web server 320 (FIG. 3). In many embodiments, the usage data can include information about the users using and/or completing transactions at the first channel and the second channel. In several embodiments, the usage data can include the quantity of conversions by each of the users using the first channel and the quantity of conversions by each of the users using the second channel during a first time period. In some embodiments, the first time period can be approximately three months. In other embodiments, the first time period can be one month, two months, four months, six months, a year, or another suitable time period. As an example, the usage data can track that a user purchased items at the one or more physical stores twice during the past three months, and that the use also purchase items online twice during the past three months. In other embodiments, usage data can include other metrics instead of, or in addition to, the quantity of conversions by each of the users for each of the channels. For example, the usage data for each user can include metrics such the number of times the user used the website, add-to-cart statistics on the website for the user, purchase amounts for the user on the website and/or in the one or more physical stores, and/or other suitable information.

In several embodiments, method 400 also can include a block 402 of performing a classification of first users of the users into a first group and second users of the users into a second group. In many embodiments, the classification can be based on the usage data. In some embodiments, the classification of the first users into the first group can be conditioned on: (a) a quantity of conversions using the first channel for each of the first users in the first group being greater than or equal to a first threshold during the first time period, and (b) a quantity of conversions using the second channel for each of the first users in the first group being less than a second threshold during the first time period. In several embodiments, the classification of the second users into the second group can be conditioned on the quantity of the conversions using the second channel for each of the second users in the second group being greater than or equal to the second threshold during the first time period. In some embodiments, the first threshold is one, and the second threshold also is one. In other embodiments, the first threshold can be two, three, four, five, or another suitable number, and/or the second threshold can be two, three, four five, or another suitable number. In some embodiments, the first threshold can be the same as the second threshold. In other embodiments, the first threshold can be different from the second threshold. In yet other embodiments, the classification of the users into the first group or the second group can be based on other criteria and/or rules using the usage data.

As an example, users who have no purchase history on the website in the past three months can be considered "store customers" and can be classified into the first group. Users who have purchased items on the website at least once in the past three months can be considered "online customers." In other embodiments, as explained above, other criteria and/or rules can be used to classify the users into the first group or the second group.

In many embodiments, the classification of each of the users can define a context for the user. In several embodiments, the classification of a user into a group or context can be transient, and can change readily. For example, suppose user A purchased items only in physical stores in the last three months. User A then visits the website, and can be classified, based on the conditions described above, into the first group as a store customer. If user A then makes a purchase on the website and if user A then visits the website a week later, then user A can be classified on this subsequent visit, based on the conditions described above, as an online customer.

In a number of embodiments, method 400 additionally can include a block 403 of, for each impression of a content element of content elements being displayed on a website to a user of the users, tracking impression response data including: (a) whether the user is grouped into the first group or the second group, and (b) response data including: (i) a first response by the user to the content element in the first channel, and (ii) a second response by the user to the content element in the second channel. In many embodiments, each of the content elements can include information regarding one or more items available on the website. The content elements can be similar or identical to the content elements described above. Each time a content element is displayed to a user can be referred to as an "impression."

In many embodiments, the first response can indicate whether or not the user responded to the content element in the first channel, and the second response can indicate whether or not the user responded to the content element in the second channel. In some embodiments, for the response data, the first response by the user to the content element in the first channel indicates whether or not the user performed a first channel conversion associated with the content element, and/or the second response by the user to the content element in the second channel indicates whether or not the user performed a second channel conversion associated with the content element. In other embodiments, a metric other than conversion can be used. For example, a metric such as click-through-rate can be used to indicate a second response by the user to the content element in the second channel.

In several embodiments, the first channel conversion can be referred to as a "store conversion," and the second channel conversion can be referred to as an "online conversion." In several embodiments, the first channel conversion can be tracked as having been performed when the user purchased at least one of the items displayed in the content element in the first channel within a second time period of the content element being displayed on the website to the user. In some embodiments, the second time period can be approximately seven days. In other embodiments, the second time period can be approximately one day, two days, three days, four days, five days, six days, two weeks, three weeks, or another suitable time period. As an example, if the content element is displayed to a user A on a webpage on the website on a first date, called the impression date, and if user A purchases at least one of the items shown in the content element from a physical store within seven days from the impression date, then the impression can be tracked as a first channel conversion, also referred to as a store conversion.

In a number of embodiments, the second channel conversion can be tracked as having been performed when the user purchased at least one of the items displayed in the content element in the second channel within a third time period of the content element being displayed on the website to the user. In some embodiments, the third time period can be approximately seven days. In other embodiments, the third time period can be approximately one day, two days, three days, four days, five days, six days, two weeks, three weeks, or another suitable time period. In several embodiments, the third time period can be the same as the second time period. In other embodiments, the third time period can be different from the second time period. As an example, if the content element is displayed to a user A on a webpage on the website on the impression date, and if user A purchases at least one of the items shown in the content element through the website within seven days from the impression date, then the impression can be tracked as a second channel conversion, also referred to as an online conversion. In some embodiments, if the impression to the user results in both a store conversion and an online conversion, the impression can be tracked as both a first channel conversion and a second channel conversion.

In several embodiments, method 400 further can include a block 404 of receiving a request from a first user of the users to display a webpage of the website. In many embodiments, the webpage can be one of the webpages on the website that includes one or more content elements. For example, the webpage can be a homepage of the web site, or another webpage of the web site that includes one or more content elements.

In a number of embodiments, method 400 additionally can include a block 405 of generating the webpage to include a selected content element from among the content elements. In many embodiments, the selected content element can be selected based on the classification of the first user and the impression response data for the content elements. In several embodiments, the selected content element can be selected to resolve the explore-exploit decision by considering by the classification of the user and the differences between the channels in the past performance of the content elements. In many embodiments, block 405 can be implemented as shown in FIG. 5 and described below.

In many embodiments, selecting the selected content element can be performed each time a user requests a webpage on the website that includes a content element. Each time the first user visits a particular webpage, such as the homepage of the website, omnichannel content selection system 310 (FIG. 3) can potentially make different choices about which content element to select and display on the webpage, due to randomness introduced in the approach to selecting the module, even if the method of selecting the appropriate module remains the same. Thus, for example, each time the homepage is requested by the first user, omnichannel content selection system 310 (FIG. 3) can select a content element. In many embodiments, method 400 further can include collecting feedback by tracking the impression response data for the first user in each of the first channel and the second channel, similarly as described above in block 403 (FIG. 3).

In several embodiments, the approach to selecting the content element also can depend on the context. For example, depending on whether the classification of the user is in the first group as a store customer or the second group as an online customer, the approach to selecting the content element can be different. In a number of embodiments, each time feedback is collected, the feedback can be associated with the approach for the group in which the user is classified.

Figure 5:
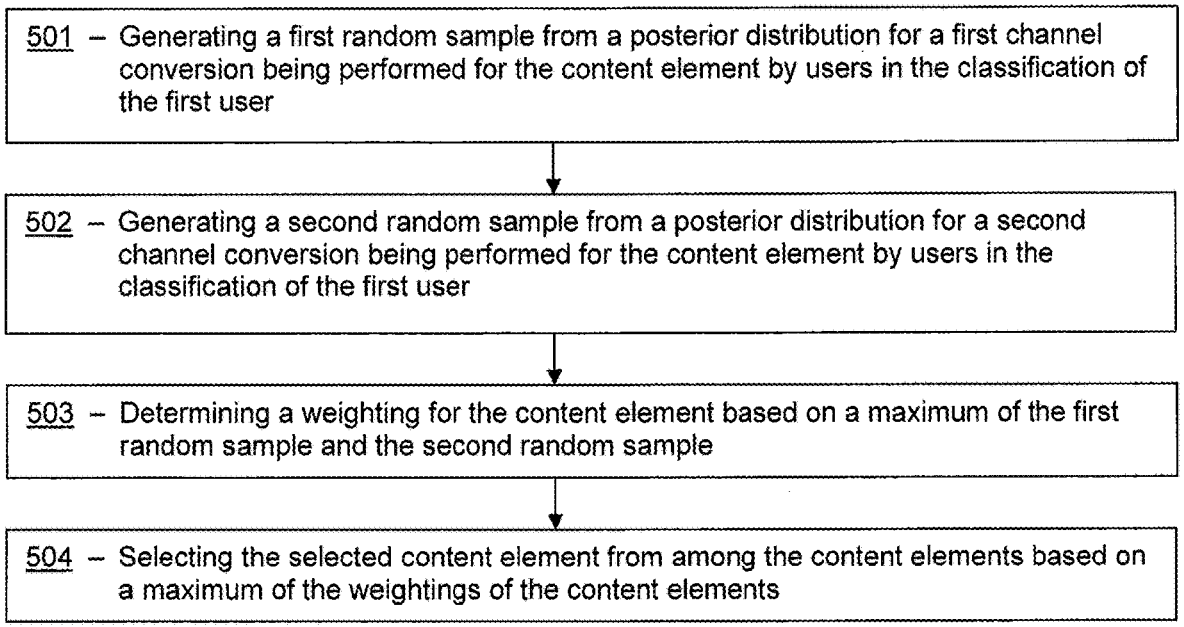
FIG. 5 illustrates a flow chart for a block of generating a webpage with a selected content element, according to the embodiment of FIG. 4.

Turning ahead in the drawings, FIG. 5 illustrates a flow chart for block 405 of generating the webpage to include a selected content element from among the content elements. Block 405 is merely exemplary and is not limited to the embodiments presented herein. Block 405 can be employed in many different embodiments or examples not specifically depicted or described herein. In some embodiments, the procedures, the processes, and/or the activities of block 405 can be performed in the order presented. In other embodiments, the procedures, the processes, and/or the activities of block 405 can be performed in any suitable order. In still other embodiments, one or more of the procedures, the processes, and/or the activities of block 405 can be combined or skipped.

In several embodiments, blocks 501, 502, and/or 503, described below, can be performed for each content element of the content elements.

Referring to FIG. 5, block 405 can include a block 501 of generating a first random sample from a posterior distribution for a first channel conversion being performed for the each content element by users in the classification of the first user, based on the impression response data for the each content element. In many embodiments, the first channel conversion can be defined as described above.

Conventional approaches to selecting content elements to resolve the explore-exploit dilemma often use Thompson sampling. For example, suppose the objective is to increase a single conversion rate (that is not channel dependent) by choosing an appropriate content element on the homepage of the website. Thompson sampling would operate, each time facing the explore-exploit dilemma, by generating, for each content element C, a random sample w(C) from the posterior distribution of the conversion rate of content element C, and selected the content as follows:

Selected content element=argmax$_C$ w(C)

An extension of this approach can be to choose more than one content element by choosing the top n content elements from a sorted list of w(C) in descending order. The Thompson sampling approach generally stops exploring the content elements in which the conversion rate is low, as the random sample drawn from the posterior distribution of the conversion rate of such a content element is very unlikely to be more than that of the other better-performing content elements. Moreover, the Thompson sampling approach can keep exploring content elements in which there is still a decent chance of being effective, such as a content element having a posterior conversion rate distribution with a relatively lower mean but a high volatility, indicating that limited information has been gathered about the content element. Further the Thompson sampling approach can exploit the content elements with the current highest mean in posterior conversion rate distribution, as this content element is most likely to be the selected content element.

In many embodiments, omnichannel content selection system 310 (FIG. 3) can improve the Thompson sampling approach for the omnichannel setting each time the explore-exploit dilemma is faced by generating, for each content element C and each channel ch, a random sample w(C, ch) from the posterior distribution of the conversion rate for the content element C in channel ch. For example, if the channels are store and online, two samples can be drawn, one for conversion rate in store and one for conversion rate online. The content element can be selected as follows:

Selected content element=argmax$_C$ max$_{Ch}$ w(C,ch)

An extension of this approach can be to choose more than one content element by choosing the top n content elements from a sorted list of max$_{Ch}$ w(C, ch) in descending order.

Use of the max function across the random samples chosen for the channels can beneficially select the most promising channel. The reason behind this choice is that, in the relatively short window used to determine conversion, it is very unlikely that the many users will convert in multiple channels for the items in the selected content element, so it is preferable to place the full bet on the most promising channel. In other situations in which conversion in multiple channels is likely, a sum function can be used as follows to select the content element:

$$\text{Selected content element} = \text{argmax}_C \sum_{ch} w(C, ch)$$

This alternate version still uses the granular information about the conversion rates in each channel for each content element, and can be used in situations in which conversions in multiple channels is likely.

When also considering context in the omnichannel setting, the approach to selecting the content element can be altered by, for each context, x, generating a random sample w(x, C, ch) from the posterior distribution of the conversion rate for the content element C in channel ch for context x. The content element can be selected as follows:

Selected content element for context x=argmax$_C$ max$_{ch}$ w(x,C,ch)

As described above, the context x can be characteristics of the user, anchor item features, etc. For example, context x can be whether the user is classified in the first group as a store customer or in the second group as an online customer. As a result of this adapted approach, the content elements selected to be displayed to store customers are more likely to be content elements designed for store conversion when the store customers visit the webpage, whereas the content elements selected to be displayed to online customers are more likely to be content elements designed for online conversion when the online customers visit the webpage.

Consider a simplified example in which there are three content elements, $C_1$, $C_2$, and $C_3$, from which the selected content element can be selected. For each of the content elements, the impression response data can include information that can be used to derive the probability for store conversion or online conversion depending on the context of either a store customer or an online customer. The probabilities for these four combinations of scenarios can be expressed as follows for content element $C_1$:

$P$(store conversion|$C_1$,store customer)

$P$(online conversion|$C_1$,store customer)

$P$(store conversion|$C_1$,online customer)

$P$(online conversion|$C_1$,online customer)

The probabilities can be expressed in the form of posterior distributions using conventional Bayesian techniques, such as a Beta distribution, based on the impression response data. For example, the posterior distributions for $C_1$ can be expressed based on a certain set of data in the impression response data as follows:

$P$(store conversion|$C_1$,store customer)~Beta(10,90)

$P$(online conversion|$C_1$,store customer)~Beta(1,99)

$P$(store conversion|$C_1$,online customer)~Beta(4,96)

$P$(online conversion|$C_1$,online customer)~Beta(2,98)

The posterior distributions can be regularly updated based on updates to the impression response data, as described above in block 403 (FIG. 4). For example, consider a situation in which $C_1$ has been selected for display to 10 additional store customers, out of whom 1 has had a store conversion and none have had an online conversion. Consider further that $C_1$ has been selected for display to 5 additional online customers, out of whom none have converted in store or online. By incorporating this feedback, along with the existing data, into the impression response data, the posterior distributions for $C_1$ can be expressed as follows:

$P$(store conversion|$C_1$,store customer)~Beta(10+1=11,90+9=99)

$P$(online conversion|$C_1$,store customer)~Beta(1+0=1, 99+10=109)

$P$(store conversion|$C_1$,online customer)~Beta(4+0=4, 96+5=101)

$P$(online conversion|$C_1$,online customer)~Beta(2+0=2,98+5=103)

Posterior distributions can be generated for content elements $C_2$ and $C_3$ in a similar manner.

If the first user who requested the webpage in block 404 (FIG. 4) is classified in the first group as a store customer, for each of the content elements, omnichannel content selection system 310 (FIG. 3) can generate a random sample for the probability of store conversion in the context of a store customer, which would be a random sample from Beta(11, 99), in this example.

In several embodiments, block 405 also can include a block 502 of generating a second random sample from a posterior distribution for a second channel conversion being performed for the each content element by users in the classification of the first user, based on the impression response data for the each content element. In the example above, if the first user who requested the webpage in block 404 (FIG. 4) is classified in the first group as a store customer, for each of the content elements, omnichannel content selection system 310 (FIG. 3) can generate a random sample for the probability of online conversion in the context of a store customer, which would be a random sample from Beta(1,109), in this example.

In a number of embodiments, block 405 additionally can include a block 503 of determining a weighting for the each content element based on a maximum of the first random sample and the second random sample. For example, block 503 can involve selecting the greater of the first random sample and second random sample. As explained above, the maximum of the random samples for the different channels can be determined. This approach can provide an advantageous improvement in the computer functionality over the conventional Thompson sampling approach in which only one posterior distribution is associated with a content element for a given context. In the example above, the maximum can be determined from the random samples generated from Beta(11, 99) and Beta(1,109) to determine the weight for content element $C_1$. In other words, for each of the content elements, if the first user is classified in the first group as a store customer, the random sample generated for the probability of store conversion for the content element in the context of a store customer and the random sample generated for the probability of online conversion for the content element in the context of a store customer can be input into the maximum function to determine the weight of the content element. The weights for each of the other content elements, $C_2$ and $C_3$, can be generated in a similar manner.

In several embodiments, block 405 further can include a block 504 of selecting the selected content element from among the content elements such that the weighting of the selected content element is a maximum of the weightings of the content elements. For example, if the weighting for $C_2$ is higher than the weightings for $C_1$ and $C_3$, as calculated in block 503, $C_2$ can be selected as the selected content element to include in the webpage generated in block 405 (FIG. 4). The content element with the maximum weight can thus be shown to the first user. If the first user were instead classified in the second group as an online customer, then the posterior distributions used for generating the random samples in blocks 501 and 502 can be based on the context of an online customer.

Based on the randomness built into the approach, each time the user visits the webpage, the content element displayed is not guaranteed to be the same, even if the context of the user (e.g., store customer vs. online customer) remains the same, as the randomness across the posterior distributions will continue to explore content elements that are not yet proven through sufficient impression data to have low effectiveness, and will continue to exploit content elements that have been proven through impression data to be effective. The feedback received from the users will continue to change the posterior probabilities, thus influencing the approach in selecting the module. Based on actions of a user, the context of the user can change, such as if a store customer suddenly started shopping on the website to become an online customer. The approach of choosing the content element thus also adapts to the ever-changing channel preferences of the user.

Figure 7:
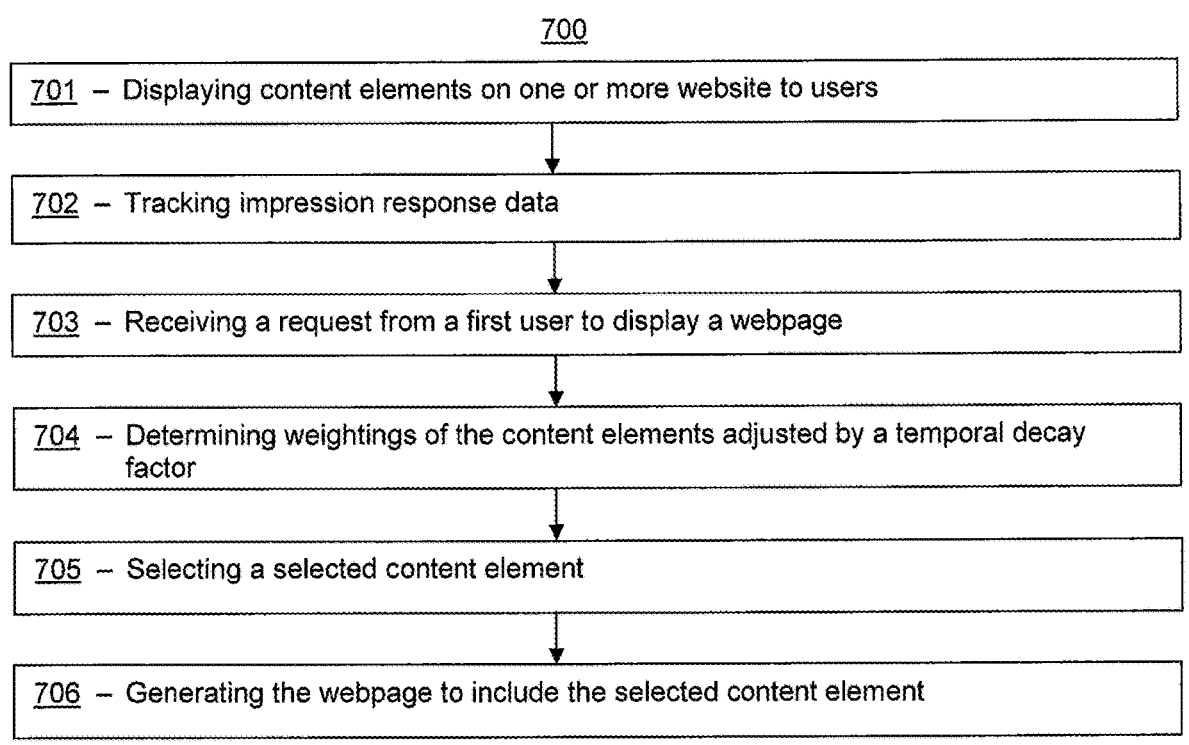
FIG. 7 illustrates a flow chart for a method, according to another embodiment.

Jumping ahead in the drawings, FIG. 7 illustrates a flow chart for a method 700. In some embodiments, method 700 can be a method of automatic resolution of the explore-exploit decision with revival. Method 700 is merely exemplary and is not limited to the embodiments presented herein. Method 700 can be employed in many different embodiments or examples not specifically depicted or described herein. In some embodiments, the procedures, the processes, and/or the activities of method 700 can be performed in the order presented. In other embodiments, the procedures, the processes, and/or the activities of method 700 can be performed in any suitable order. In still other embodiments, one or more of the procedures, the processes, and/or the activities of method 700 can be combined or skipped.

In many embodiments, system 300 (FIG. 3), selection system 305 (FIG. 3), and/or revival selection system 311 (FIG. 3) can be suitable to perform method 700 and/or one or more of the activities of method 700. In these or other embodiments, one or more of the activities of method 700 can be implemented as one or more computing instructions configured to run at one or more processors and configured to be stored at one or more non-transitory computer readable media. Such non-transitory computer readable media can be part of a computer system such as selection system 305 (FIG. 3), web server 320 (FIG. 3) and/or physical stores system 325 (FIG. 3). The processor(s) can be similar or identical to the processor(s) described above with respect to computer system 100 (FIG. 1).

In some embodiments, method 700 and other blocks in method 700 can include using a distributed network including distributed memory architecture to perform the associated activity. This distributed architecture can reduce the impact on the network and system resources to reduce congestion in bottlenecks while still allowing data to be accessible from a central location.

Referring to FIG. 7, method 700 can include a block 701 of displaying content elements on one or more websites. The content elements can be similar or identical to the content elements described above. In many embodiments, the content elements can be displayed on one or more webpages associated with a website. The one or more websites can be similar or identical to the website hosted by web server 320 (FIG. 3).

In a number of embodiments, method 700 additionally can include a block 702 of, for each impression of a content element of content elements being displayed on one or more websites to a user of the users, tracking impression response data comprising (a) a response of the user to the content element of the content elements displayed on the one or more websites and (b) a time of the response of the user. The users can be similar or identical to users 340-341 (FIG. 3). In many embodiments, a time of the response of the user can be conditioned on (a) a quantity of impressions using a first period of time for each of the users being greater than or equal to a first threshold during the first time period, and (b) a quantity of impressions using a second period of time for each of the users being less than a second threshold during the first time period. In many embodiments, each of the content elements can include information regarding one or more items available on the website. The content elements can be similar or identical to the content elements described above. Each time a content element is displayed to a user can be referred to as an "impression."

In many embodiments, the impression response data can track conversion rate of the content elements by the users. In several embodiments, tracking impression response data can track a conversion rate of the content elements by the users. In other embodiments, impression response data can track a conversion rate of the content elements by an item (e.g., an anchor item) of a webpage. In several embodiments, impression response data can track a conversion rate of the content elements by a location (e.g., a state or zip code).

In several embodiments, each response of a user to an impression can be tracked in the impression response data by a time of the response by the user. When the weightings of the selected content elements are determined, as described below in block 704, the temporal decay factor can be applied to adjust weightings based on the time of the response. In a number of embodiments, times of the impression response data can be tracked on a weekly basis, and the temporal decay factor can be applied to adjust the impression response data on a weekly basis once the weightings of the content elements can be determined. For example, all impression responses during a first week can be tracked and/or applied as having occurred during the first week, and all impression responses during a second week can be tracked and/or applied as having occurred during the second week. As described below in more detail, tracking the impression responses on a weekly basis can treat responses on each day of the same week the same, to avoid the effects of weekly seasonality (e.g., a content element being more popular on weekend days than other non-weekend days). In other embodiments, times of the impression response data can be tracked and/or applied on daily basis, a monthly basis, or on another suitable time period.

In many embodiments, the response of the user can indicate whether or not the user responded to the content element displayed on one or more websites during a period of time. In some embodiments, for the impression response data, the response by the user to the content element can indicate whether or not the user performed a conversion associated with the content element (e.g., the user purchased through the website an item included in the content element). In other embodiments, a metric other than conversion can be used. For example, a metric such as click-through-rate can be used to indicate a response by the user to the content element displayed on one or more websites. In yet another embodiment, add-to-cart can be used as a response metric. In several embodiments, the conversion can be tracked as having been performed when the user purchased at least one of the items displayed in the content element.

Figure 8:
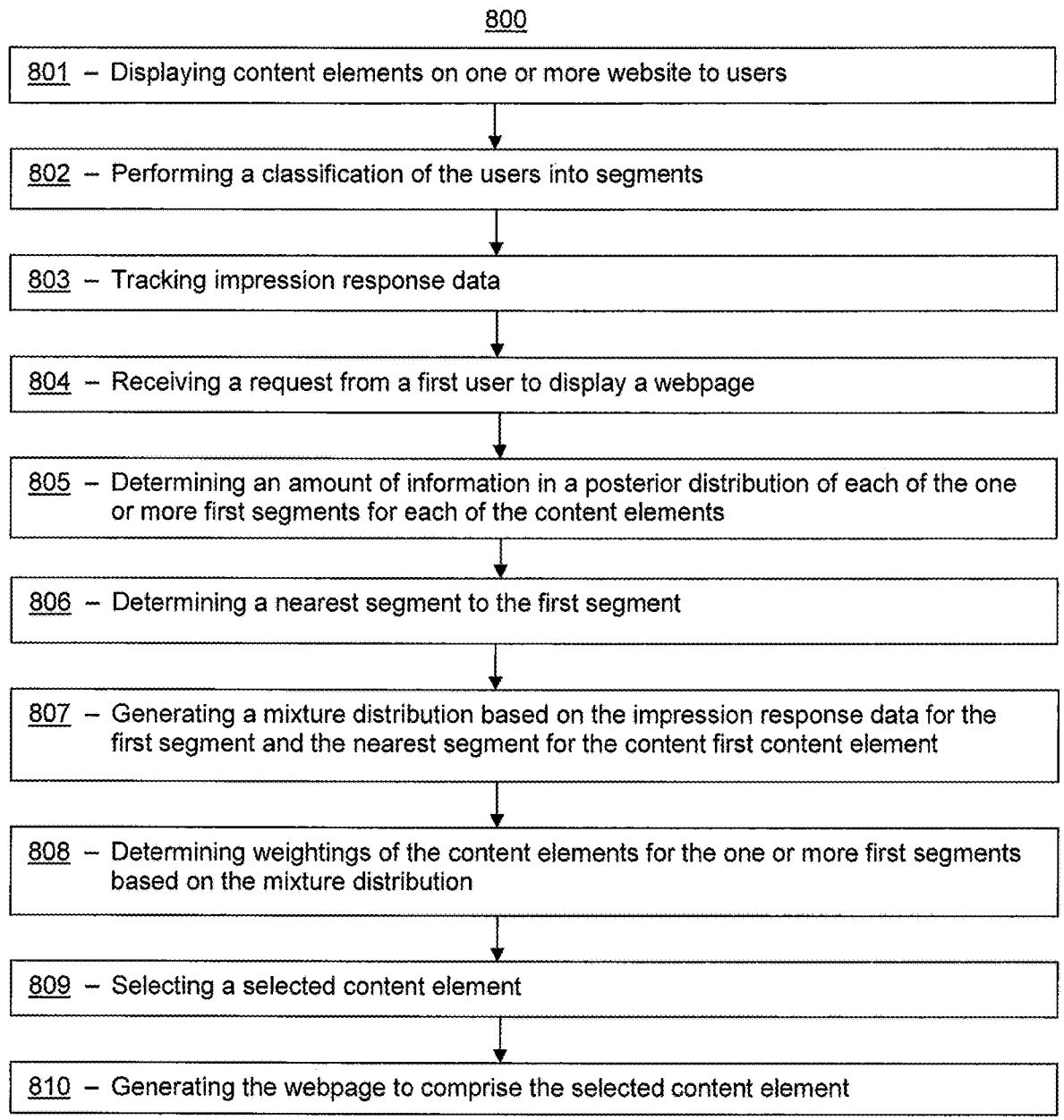
FIG. 8 illustrates a flow chart for a method, according to another embodiment.

In some embodiments, block 702 of, for each impression of a content element of content elements being displayed on one or more websites to a user of the users, tracking impression response data comprising (a) a response of the user to the content element of the content elements displayed on the one or more websites and (b) a time of the response of the user also can include various techniques from block 403 (FIG. 4) and/or block 803 (FIG. 8, described below). For example, in some embodiments, each of the users can be assigned a channel classification, and the impression response data can further comprise for each impression of the content element (a) the channel classification for the user of the users, and (b) responses of the user in each of two channels, as described in block 403 (FIG. 4). In the same or other embodiments, the users can be classified into segments, and the impression response data can further comprise, for each impression of the content element, one or more segments of the segments in which the user can be classified, as described further in block 803 (FIG. 8, described below).

In several embodiments, method 700 further can include a block 703 of receiving a request from a user of the users to display a webpage of the one or more websites. In many embodiments, the webpage can be one of the webpages on the website that includes one or more content elements. For example, the webpage can be a homepage of the website, or another webpage of the website that includes one or more content elements.

In several embodiments, method 700 further can include a block 704 of determining weightings of the content elements based on posterior distributions using the impression response data, as adjusted by a temporal decay factor based on the times of the impression response data for the content elements. In a number of embodiments, block 704 of determining weightings of the content elements based on posterior distributions using the impression response data, as adjusted by a temporal decay factor based on the times of the impression response data for the content elements can include generating a random sample from a posterior distribution of the posterior distributions for each content element of the content elements, using the impression response data, as adjusted by the temporal decay factor based on a time of the times of the impression response data for the each content element. A weighting, w(C), can be generated as a random sample from a posterior distribution for each content element, based on the impression response data for the each content element. This temporal decay factor can be used to adjust the posterior distribution, which is based on the impression response data, as described below. In some embodiments, the temporal decay factor can be fixed. In other embodiments, the temporal decay factor can be adapted based on changes in the impression response data using a correlation computation. In a number of embodiments, the temporal decay factor can be further adapted differently based on different content element classes of the content elements.

Conventional approaches to selecting content elements to resolve the explore-exploit dilemma often use Thompson sampling that can be based on a static environment, as described above. Thompson sampling can be used in a static environment to retire (e.g., stop exploring) content elements with a low conversion rate (e.g., poor performing content elements) on a permanent basis. For example, when the impression response data indicates that a content element is never selected, even though it has been presented to users in impressions a large number of times, the posterior distribution based on this impression data can cause the content element to be effectively retired, as the weighting randomly selected from the posterior distribution is unlikely to be high enough to ever be selected. Once a content element is no longer explored, no new data (e.g., impression response data) can be gathered, so the posterior distribution of the content element would not change. In a static environment, retiring poor-performing content elements can be a desired behavior, since exploring content elements not performing wastes computer resources.

In many embodiments, revival selection system 311 (FIG. 3) can improve the conventional Thompson sampling approach by adjusting the Thompson sampling approach for an evolving environment. In the evolving environment, the conventional Thompson sampling approach of retiring content elements permanently can be an undesired result, as user preferences for the content element can change over time. By causing the posterior distribution of a content element to continue changing, even when the content element is no longer explored or effectively retired, the content element can be revived, such that the retirement is on a temporary basis. In the evolving environment, content elements (e.g., a carousel) with low conversion rates that were not performing (e.g., not resulting in conversions, click-throughs, or other suitable metrics) during a period of time could start performing at a future period of time. In several embodiments, a content element with a low conversion rate can continue to be explored based on a changing posterior distribution for the content element in an evolving environment. In some embodiments, a content element with a low conversion rates can be retired temporarily for a period of time. The retired content element can be re-explored after the period of time has elapsed. Whether the content elements remains retired after the prior of time can be based on whether the low conversion rate still holds after the retired content element is re-explored.

In a number of environments, the chance that an environment has evolved increases with time. For example, user preferences for a content element are more likely to change with the increasing passage of time. In general, the older empirical observations (e.g., impression response data) are for a content element, the less likely that the older impression response data will accurately represent the current environment (e.g., current user preferences for the content element). By discounting older impression response data and/or considering new impression response data for the content element, the content element can be revived if the conversion rates improve in response to newer impressions.

In many embodiments, the generating of posterior distributions can be redefined to include the possibility of revival for content elements previously retired by adjusting the how the impression response data is used with a temporal decay factor. The temporal decay factor, ("λ"), can be applied to each posterior distribution based on the times of the responses in the impression response data, which can affect the weighting generated for a content element. Temporal decay factor λ can be applied to cause older data or older empirical observations to be treated as less relevant than current data or current empirical observations, as expressed by:

$$1 \text{ impression}(n+1)\text{days before today} \approx \lambda^n \text{ is a number of impressions yesterday, where } 0<\lambda<1.$$

In a number of embodiments, using the same temporal decay factor λ for all the days in the period of time (e.g., a week) can eliminate weekly seasonality effects (e.g., situations in which certain days of the week have higher conversions than other days of the week). In some embodiments, applying temporal decay factor on a weekly basis can be expressed as:

$$1 \text{ impression}(n+1)\text{weeks before today} \approx \lambda^n \text{ A number of impressions last week, where } 0<\lambda<1.$$

In many embodiments, applying temporal decay factor λ can result in a revival of a retired content element. By applying temporal decay factor λ, the posterior distribution for a retired content element can keep changing even if the retired content element was not recently selected. By applying temporal decay factor λ, the confidence on a learning (e.g., the expected performance of a content element) can decrease as the data ages over time, because the content element was last selected, which can allow the content element to be revived for re-exploration.

Without applying a temporal decay factor, a posterior distribution based on a tracked metric (e.g., conversion rate) can be determined as follows:

$$\text{Posterior}(\theta(C)) = \text{Prior}(\theta(C))\Pi_{i=1}^{n(C)}(\theta(C))^{m_i(C)}(1-\theta(C))^{1-m_i(C)},$$

where C represents a content element that is presented in impressions i; each impression is counted as a trial (e.g., response); $m_i(C)$ is a response or reward function that measures a desired metric (e.g., conversion rate), such that $m_i(C)$ is 1 if the i-th impression of C resulted in a conversion (or other measured response metric) and 0 otherwise; $\theta(C)$ is the conversion rate for content C, which is the conversion probability for each trial (e.g., each impression). With independent trials, the total number of conversions follow Bin (n(C), $\theta(C)$), where n(C) is the total number of impressions for content element C, and Bin is a binomial function. In such a case, each trial (e.g., each impression) is given equal weight in its contributions to the generation of posterior distribution.

In many embodiments, the process of generating a posterior distribution can be using temporal decay factor to discount the older impression response data, as follows:

$$\text{Posterior}(\theta(C)) = \text{Prior}(\theta(C)) \times \prod_{i=1}^{n(C)} \left[(\theta(C))^{m_i(C)}(1 - \theta(C))^{(1-\theta(C))(1-m_i(C))}\right]^{\lambda^{age(i)}}, \quad (1)$$

where age(i)=j if the i-th impression was shown (j+1) weeks ago, and 0<λ<1 is a design parameter, which can be predetermined or adapted, as described below in further detail. In many embodiments, Prior($\theta(C)$) can be the Beta($\alpha,\beta$)distribution, so that the posterior distribution of $\theta(C)$ becomes:

$$\text{Beta}\left(\alpha + \sum_i \lambda^{age(i)} M_i(C), \beta + \sum_i \lambda^{age(i)}(1 - m_i(C))\right)$$

Even if no new data is added on a content element, the age(i) for all i can keep changing with time, which in turn can force the posterior distribution to change.

Properties of the Beta posterior distribution, when used with temporal decay factor λ can advantageously adjust the behavior of the posterior distribution to handle an evolving environment. The posterior mean can be determined as follows:

$$\text{Posterior mean} = \frac{\alpha + \sum_i \lambda^{age(i)} m_i(C)}{\alpha + \sum_i \lambda^{age(i)} m_i(C) + \beta + \sum_i \lambda^{age(i)}(1 - m_i C)} =$$

$$\frac{\alpha + \sum_i \lambda^{age(i)} m_i(C)}{\alpha + \beta + \sum_i \lambda^{age(i)}} = \frac{\alpha + \beta}{\alpha + \beta + \sum_i \lambda^{age(i)}} \cdot \frac{\alpha}{\alpha + \beta} =$$

$$\sum_{\{j: j=age(i) \text{ for some } i\}} \frac{\lambda^j (\text{Total impressions in the } (j+1)-th \text{ week})}{\alpha + \beta + \sum_i \lambda^{age(i)}} \times$$

$$\frac{(\text{Total conversions in the } (j+1)-th \text{ week})}{(\text{Total impressions in the } (j+1)-th \text{ week})},$$

which can show that the posterior is a weighted average of weekly conversion rates and prior estimated conversion rates. The weight for each weekly conversion rate can thus decrease as the data gets older.

The posterior variance can be determined as follows:

$$\text{Posterior Variance} = \frac{1}{\alpha + \beta + \sum_i \lambda^{age(i)}} \times \text{Posterior mean} \times (1 - \text{Posterior mean}).$$

Even if the posterior mean stabilizes once exploring the selected content element is stopped, the posterior variance can increase as age increases for the data, which can lower confidence in existing understanding of how poorly the content element performs, thus increase the probability of re-exploring the retired content element. Re-exploring a retired content element can be a desired behavior of the posterior distribution for an evolving environment.

In many embodiments, computational customizations (e.g., optimizations) can be applied to generating posterior distributions. For example, computing the posterior distribution can be based on processing a portion of the data, not the entire data, such that Equation (1) is re-written as follows:

$$\text{Posterior}(\theta(C)) = [\text{Prior}(\theta(C))]^{(1-\lambda)}[\text{Posterior}_{a \text{ week ago}}(\theta(C))]^{\lambda} \times$$

$$\sum_{i: i \text{ was shown last week}} [(\theta(C))^{m_i(C)}(1 - \theta(C))^{(1-m_i(C))}].$$

In several embodiments, by applying the weekly update above in the Beta-Binomial setup (prior=beta, empirical=binomial), the α and β parameters for the posterior beta distribution for a content element (e.g., carousel) can be defined as follows:

$\alpha_{posterior} = \alpha_{prior}(1-\lambda) + \lambda\alpha_{posterior\ a\ week\ ago} + $ Total conversions last week $\beta_{posterior} = \beta_{prior}(1-\lambda) + \lambda\beta_{posterior\ a\ week\ ago} + $ Total impressions last week−Total conversions last week.

In some embodiments, temporal decay factor λ can be a predetermined fixed value. For example, temporal decay factor λ can be 0.3, 0.4, 0.5, or another suitable predetermined decay factor. A lower temporal decay factor can cause older data to be discounted more quickly. In other embodiments, temporal decay factor λ can be adapted dynamically. In several embodiments, temporal decay factor λ can be adjusted dynamically as it is used, such as in the previously described computations, to determine the weightings of the content elements. By using a temporal decay factor that is fixed for each weekly update of data for a content element, temporal decay factor λ balanced the old and recent impression response data when aggregating the weekly data for each of the content elements. By contrast, using a temporal decay factor that is adaptive can adapt to the evolution environment and adjust to trends. For example, if the performance of a content element recently is very different from older performance of the content element, the environment might have evolved significantly, such that older impression response data can be discounted more significantly, in which case temporal decay factor λ can be lowered. By contrast, if the performance over time indicates that the environment has not changed significantly, the older data can be discounted less significantly by using a higher temporal decay factor λ to allow this older data to be used more to reinforce the recent data.

In some embodiments, temporal decay factor λ can be adapted as follows:

$$\lambda = \begin{cases} \text{Corr}\left(\dfrac{\text{posterior mean a week ago,}}{\text{last week mean}}\right), & \text{if value} \geq 0.01, \\ 0.01 & \text{otherwise,} \end{cases} \quad (2)$$

where Corr is a correlation computation, and the data for the correlation computation comes from the content elements (e.g., common carousels) that are common to both means. Using the correlation computation can adjust temporal decay factor λ based on whether there was much change in the past week. A floor of 0.01 can be used so temporal decay factor λ does not go to zero or negative. An indication of different trends also can indicate an environment evolution, when temporal decay factor λ uses the posterior mean a week ago and/or the posterior mean last week for content elements. In some embodiments, content elements introduced for the first time and/or content elements that were not selected last week would not influence the computation of temporal decay factor λ. When temporal decay factor λ is dynamically set to a low value (e.g., indicating there is evolution in the environment), the chances of revival of a retired content element can increase, as the posterior distribution becomes more diffuse.

Temporal decay factor λ can be adapted when used in calculating posterior distributions of content elements to indicate overall trends in the environment. However, a smaller group of content elements can follow different trends from a perspective of a global trend. In some embodiments, temporal decay factor λ can be adapted across different classes of content elements. By adapting temporal decay factor λ across different classes of content element, different trends in different content element classes, such as, seasonal costumes, can be captured. An example can include Halloween costumes that can be classified into a content class that is different from other content classes. Then, once temporal decay factor λ is adapated for a Halloween costume that is displayed on a content element (e.g., carousel), which can indicate a change in trend, temporal decay factor λ for other Halloween costume carousels can follow the trend. The correlation computation described above can be modified by restricting the content elements (e.g., carousels) from a particular class of content elements to define the adaptive decay parameter to the particular class of content elements.

Generating an updated posterior distribution using temporal decay factor λ that is adaptive, can be performed as follows:

$$\text{Posterior}(\theta(C)) = \text{Prior}(\theta(C)) \times \prod_{i=1}^{n(C)} [(\theta(C))^{m_i(C)}(1-\theta(C))^{(1-m_i(C))}]^{\prod_{k=1}^{age(i)} \lambda_k}, \quad (3)$$

where age(i)=j if the i-th impression was shown (j+1) weeks ago, 0<$\lambda_k$<1 is the adaptive λ computed using the content performances k week(s) ago and the content performances before that, such as shown in Equation (2). Note that if age(i)=0, then $\prod_{k=1}^{age(i)} \lambda_k = 1$.

In Equation (3), the Beta(α,β) distribution can be used for Prior(θ(C)), so that the posterior distribution of θ(C) becomes $$\text{Beta}\left(\alpha + \sum_i \left(\prod_{k=1}^{age(i)} \lambda_k\right) m_i(C), \beta + \sum_i \left(\prod_{k=1}^{age(i)} \lambda_k\right)(1-m_i(C))\right)$$

As an example of empirical data and a prior distribution, consider a content element $C_1$ introduced on one or more websites three weeks ago on October 1 when the posterior distribution is calculated on October 22. Consider the data tracked for responses (e.g., clicks) to impressions of content element $C_1$ as shown in Table 1, and that the prior distribution of responses (e.g., clicks) to impressions of content element $C_1$ displayed on the website is Beta(40, 960).

TABLE 1

| Weeks (dates inclusive) | Impressions on the website | Clicks in response to impressions |
|---|---|---|
| 10/1 to 10/7 3 weeks ago | 1000 | 50 |
| 10/8 to 10/14 2 weeks ago | 2000 | 90 |
| 10/15 to 10/21 1 week ago | 1500 | 74 |

When computing the posterior distribution for content element $C_1$ on October 22, temporal decay factor λ can be adapted as follows:

$\lambda_1$=Corr(posterior mean from 10/15, last week mean)
=0.3

$\lambda_2$=Corr(posterior mean from 10/8, empirical mean from the week 10/8 −10/14)=0.7, where, in the correlation computations, content elements with available information on both scenarios above can be considered. For example, in computing $\lambda_2$, content elements that have been shown in the week 10/8-10/14 and also before 10/8 can be used in the correlation computation. The posterior distribution of a response (e.g., clicks) probability on $C_i$ on 10/22 can be Beta($\alpha_{10/22}, \beta_{10/22}$)

where $\alpha_{10/22}$=40+50×0.3×0.7+90×0.3+74, $\beta_{10/22}$=960+(1000−50)×0.3×0.7+(2000−90)×0.3+ (1500−74).

Continuing with the example, if the posterior distribution is updated weekly, the posterior response probability can be stored on content element $C_1$ on 10/15, shown as Beta($\alpha_{10/15}, \beta_{10/15}$), where $\alpha_{10/15}$=40+50×0.7+90, $\beta_{10/15}$=960+(1000−50)×0.7+(2000−90).

The posterior distribution of click probability on content $C_1$ on 10/22 will be, using the weekly update:

Beta($\alpha_{10/22}, \beta_{10/22}$)

where $$\alpha_{10/22} = \alpha_{10/15} \times 0.3 + 74 + 40 \times (1-0.3),$$

$$\beta_{10/22} = \beta_{10/15} \times 0.3 + (1500-74) + 960 \times (1-0.3).$$

Consider a situation in which content $C_1$ is not displayed in the following week of 10/22-10/28. Even if no new empirical data has been tracked for content $C_1$, the posterior distribution for the response (e.g., clicks) probability of $C_1$ can update on 10/29 as $$Beta(\alpha_{10/29}, \beta_{10/29})$$

where $$\alpha_{10/29} = \alpha_{10/22} \times 0.4 + 40 \times (1-0.4),$$

$$\beta_{10/29} = \beta_{10/22} \times 0.4 + 960 \times (1-0.4),$$

where temporal decay factor $\lambda$ from the week 10/22-10/28 can be assumed to be 0.4.

In many embodiments, block 704 of determining weightings of the content elements based on posterior distributions using the impression response data, as adjusted by a temporal decay factor based on the times of the impression response data for the content elements can include various techniques from block 405 (FIG. 4), and/or block 808 (FIG. 8). For example, the weightings can be further determined based on the channel classification of the first user and the responses of the users in each of the two channels in the impression response data, as described further in block 405 (FIG. 4). In another example, the weightings for one or more segments can be further determined based at least in part on a mixture distribution based on the impression response data for a nearest segment for one of the content elements for a segment in which the first user is classified, as described further in block 808 (FIG. 8, described below).

In several embodiments, method 700 further can include a block 705 of selecting a selected content from among the content elements based on the weightings of the content items. In a number of embodiments, block 705 of selecting a selected content from among the content elements can be based on the weightings of the content items can include determining a maximum of the weightings of the content elements. In several embodiments, block 705 of selecting a selected content from among the content elements can be based on the weightings of the content items can include selecting the selected content element from among the content elements such that a weighting of the selected content element is the maximum of the weightings of the content elements. For example, for a content element C, a random sample w(C) from the posterior distribution of the conversion rate of content element C, the selected content element can be selected as follows:

Selected content element=$\mathrm{argmax}_C w(C)$

As described above, an extension of this approach can be to choose more than one content element by choosing the top n content elements from a sorted list of w(C) in descending order.

In a number of embodiments, method 700 additionally can include a block 706 of generating the webpage to include the selected content element. In many embodiments, the selected content element can be the selected content element selected in block 705. As described above, in many embodiments, the selected content element can be selected based on the weightings of content elements adjusted by a temporal decay factor and based on the times of the impression response data for the content elements. In several embodiments, the selected content element can be selected to resolve the explore-exploit decision by considering by the weightings of the content elements derived from posterior distributions using the impression response data representing the past performance of the content elements.

Turning ahead in the drawings, FIG. 8 illustrates a flow chart for a method 800. In some embodiments method 800 can be a method of automatic resolution of the explore-exploit decision with personalization using dynamically shared learning. Method 800 is merely exemplary and is not limited to the embodiments presented herein. Method 800 can be employed in many different embodiments or examples not specifically depicted or described herein. In some embodiments, the procedures, the processes, and/or the activities of method 800 can be performed in the order presented. In other embodiments, the procedures, the processes, and/or the activities of method 800 can be performed in any suitable order. In still other embodiments, one or more of the procedures, the processes, and/or the activities of method 800 can be combined or skipped.

In many embodiments, system 300 (FIG. 3), selection system 305 (FIG. 3), and/or personalization selection system 312 (FIG. 3) can be suitable to perform method 800 and/or one or more of the activities of method 800. In these or other embodiments, one or more of the activities of method 800 can be implemented as one or more computing instructions configured to run at one or more processors and configured to be stored at one or more non-transitory computer readable media. Such non-transitory computer readable media can be part of a computer system such as selection system 305 (FIG. 3), web server 320 (FIG. 3) and/or physical stores system 325 (FIG. 3). The processor(s) can be similar or identical to the processor(s) described above with respect to computer system 100 (FIG. 1).

In some embodiments, method 800 and other blocks in method 800 can include using a distributed network including distributed memory architecture to perform the associated activity. This distributed architecture can reduce the impact on the network and system resources to reduce congestion in bottlenecks while still allowing data to be accessible from a central location.

Referring to FIG. 8, method 800 can include a block 801 of displaying content elements on one or more websites to users. The content elements can be similar or identical to the content elements described above. In many embodiments, the content elements can be displayed on one or more webpages associated with a website. In many embodiments, each of the content elements in a pool of content elements can include information regarding one or more items available on the website. The one or more websites can be similar or identical to the website hosted by web server 320 (FIG. 3). The users can be similar or identical to users 340-341 (FIG. 3).

In a number of embodiments, method 800 additionally can include a block 802 of performing a classification of the users into segments. In some embodiments, each of the users can be classified into one or more segments of the segments. In a number of embodiments, the segments can be part of a pool of segments. In many embodiments, the classification can be based on grouping individual instances (e.g., groups, context, or users) to form segments. In many embodiments, one or more segments of the segments in which the user is classified can be conditioned on similar or identical content preferences with each other. In some embodiments, contextual learning to resolve an explore-exploit dilemma per segment of the segments can involve giving up a certain amount of speed in the learning process of contextual learning in order to gain specific or individual customized content preferences of the users. In a dynamic world, a content pool and a pool of segments (e.g., one or more segments) can provide for faster contextual learning. In many embodiments, some segments of the pool of segments can have similar content preferences. Each of the segments with similar content preferences can share learnings with each other to deal with the slowness in contextual learning for customization and/or personalization.

In a number of embodiments, method 800 can include a block 803 of, tracking impression response data. In many embodiments, for each impression of a content element of content elements being displayed on the one or more websites to a user of the users, tracking impression response data can comprise (a) a response of the user to the content element of the content elements displayed on the one or more websites, and (b) one or more segments of the segments in which the user is classified. In several embodiments, a response of the user to the content element of the content elements displayed on the one or more websites can be tracked by for each context in a given time period. Each time a content element is displayed to a user can be referred to as an "impression."

In several embodiments, the impression response data can track conversion rates of the content elements by the users. In many embodiments, impression response data can include a conversion rate of the content elements by the users. In the same or other embodiments, the impression response data can include a conversion rate of the content elements by an item (e.g., an anchor item) of a webpage. In several embodiments, impression response data can include a conversion rate of the content elements by a location (e.g., a state or zip code). In many embodiments, each response of a user to an impression can be tracked in the impression response data and can be used for various knowledge sharing opportunities between one segment and another segment, as explained below in more detail.

In some embodiments, block 803 of, for each impression of a content element of the content elements being displayed on the one or more websites to a user of the users, tracking impression response data comprising (a) a response of the user to the content element of the content elements displayed on the one or more websites, and (b) one or more segments in which the user is classified also can include various techniques from block 403 (FIG. 4) and block 702 (FIG. 7). For example, in some embodiments, each of the users can be assigned a channel classification, and/or the impression response data can include for each impression of the content element (a) the channel classification for the user of the users, and (b) responses of the user in each of two channels, as described in block 403 (FIG. 4). In the same or other embodiments, the impression data can further comprise (a) a response of the user to the content element of the content elements displayed on the one or more websites and (b) a time of the response of the user, as described further in block 702 (FIG. 7).

In a number of embodiments, method 800 additionally can include a block 804 of receiving a request from a first user of the users to display a webpage of the one or more websites. In several embodiments, the first user can be classified into one or more first segments of the segments. In many embodiments, the webpage can be one of the webpages on the website that includes one or more content elements. In some embodiments, block 804 of receiving a request from a first user of the users to display a webpage of the one or more websites also can include various techniques from block 404 (FIG. 4) and block 703 (FIG. 7). For example, the webpage can be a homepage of the website, or another webpage of the website that includes one or more content elements.

In a number of embodiments, method 800 additionally can include a block 805 of determining an amount of information in a posterior distribution of each of the one or more first segments for each of the content elements. In many embodiments, determining an amount of information in a posterior distribution of each of the one or more first segments can be based on the impression response data. In several embodiments, determining an amount of information in the posterior distribution of each of the one or more first segments for each of the content elements can include generating a standard deviation of the posterior distribution. In a number of embodiments, determining an amount of information in the posterior distribution of each of the one or more first segments for each of the content elements can include generating a coefficient of variation of the posterior distribution. In some embodiments determining an amount of information of each of the one or more first segments can be useful in determining when a segment does not have enough information about a content element (e.g., a carousel). In a number of embodiments, a posterior distribution of an objective (e.g., conversion rate), for each segment of the segments and each content element of the content elements (e.g., each carousel), can be used to determine an amount of information of each of the one or more first segments. In some embodiments, the amount of information in a posterior distribution can be measured by a standard deviation and/or coefficient of variation (e.g., a standard deviation divided by a mean). The lower the standard deviation and/or coefficient of variation is, the more the amount of information collected.

In some embodiments, the standard deviation of a Beta $(\alpha,\beta)$ distribution can be computed as $$Std = \sqrt{\frac{\alpha\beta}{(\alpha+\beta)^2(\alpha+\beta+1)}}.$$

In some embodiments, the standard deviation of the posterior distribution can be set to be less than $10^{-2}$ for the segment not to borrow any knowledge from other segments.

In a number of embodiments, method 800 additionally can include blocks 806 and 807 (described below), which can be performed for each first segment of the one or more first segments and each first content element of the content elements in which the amount of information for the first segment for the first content element is below a predetermined informational threshold, such as at least 0.3 or 0.4. In some embodiments, method 800 can include block 806 of determining a nearest segment to the first segment for the first content element. In several embodiments, determining the nearest segment to the first segment for the first content element can include determining second segments of the segments in which an amount of information in a posterior distribution of each of the second segments is equal to or greater than the predetermined informational threshold. In a number of embodiments, determining the nearest segment to the first segment for the first content element can include computing, for each second segment of the second segments, a correlation between a posterior means of common content elements in the first segment and the second segment. In several embodiments, determining the nearest segment to the first segment for the first content element can include selecting the nearest segment from among the second segments based on a maximum of the correlations for the second segments. In a number of embodiments, determining the nearest segment to the first segment for the first content element can include the common content elements in the first segment and the second segment can be restricted to content elements that belong to an identical content element class. In many embodiments, determining a nearest segment to the first segment for the first content element can also include determining which segment $S_{nearest}(S,C)$ from which to borrow information. The segment $S_{nearest}(S,C)$ can be the segment which is most similar to segment S in terms of similar content preferences. In some embodiments, there can be no nearest segment $S_{nearest}(S,C)$ that exists between the first segment and the one or more first segments. In several embodiments, while finding $S_{nearest}(S,C)$ for segment S and carousel C, search for a segment of the segments with content preferences most similar to S with reliable and/or accurate information on the performance of C. In some embodiments, the search can be restricted to some content class that C belongs to. For example, $S_{nearest}(S,C)$ can be found as follows: For each segment T such that Posterior(T,C) meets the predetermined informational threshold, compute the correlation in posterior means of common contents and/or carousels in S and T, restricted to those content elements (e.g., carousels) belonging to the same content class as C, where each content element (e.g., carousel) participating in the correlation computation has a posterior distribution that at least meets predetermined information threshold for both S and T. $S_{nearest}(S,C)$ is the segment T with the highest correlation, given the correlation is above a preset threshold. Therefore, $S_{nearest}(S,C)$ can be the segment with content preferences most similar to S in the content class that C belongs to, which has some reliable information on the performance of C.

In many embodiments, determining a nearest segment to the first segment for the first content element from which to borrow information can be the segment most similar to segment S in terms of content preferences. Identifying the nearest segment using, $S_{nearest}(S,C)$ can involve, for each segment T such that Posterior(T,C) meets the amount of a predetermined informational threshold, computing a correlation in posterior means of common content elements (e.g., common carousels) in S and T, where each content element (e.g., carousel) participating in the correlation computation can at least meet the posterior information amount required by the predetermined informational threshold for both S and T. S can represent a segment in terms of content preferences and C is a content. In some embodiments, $S_{nearest}(S,C)$ can be the segment T with the highest correlation, given the correlation is above the predetermined informational threshold. Based on this derivation, $S_{nearest}(S,C)$ can advantageously be the segment with content preferences most similar to S that has some reliable and/or accurate information on the performance of C. In some embodiments, computing the correlation can involve at least 2 data points, in absence of which the correlation will be undefined leading to a conclusion that no $S_{nearest}(S,C)$ exists.

In several embodiments, while finding $S_{nearest}(S,C)$ for segment S and carousel C, search for a segment of the segments with content preferences most similar to S with reliable and/or accurate information on the performance of C. In some embodiments, the search can be restricted to some content class that C belongs to. For example, $S_{nearest}(S,C)$ can be found as follows: For each segment T such that Posterior(T,C) meets the predetermined informational threshold, compute the correlation in posterior means of common contents and/or carousels in S and T, restricted to those content elements (e.g., carousels) belonging to the same content class as C, where each content element (e.g., carousel) participating in the correlation computation has a posterior distribution that at least meets predetermined information threshold for both S and T. $S_{nearest}(S,C)$ is the segment T with the highest correlation, given the correlation is above a preset threshold. Therefore, $S_{nearest}(S,C)$ can be the segment with content preferences most similar to S in the content class that C belongs to, which has some reliable information on the performance of C.

In a number of embodiments, method 800 additionally can include a block 807 of generating a mixture distribution based on the impression response data for the first segment and the nearest segment for the first content element. In many embodiments, generating a mixture distribution can be for the first segment for the first content element based on the impression response data for the first segment for the first content element. In several embodiments, generating a mixture distribution can be for the first segment for the first content element based on the impression response data for the nearest segment for the first content element. The mixture distribution can be used to share information from the nearest segment with the first segment. For example, if the amount of information for a content C, representing a segment, is lower than the predetermined informational threshold, a mixture distribution can be used to generate a sample (e.g., w(S,C)).

In many embodiments, the mixture distribution can be used for sampling the weights in block 808 (described below) can be as follows:

$$q(S,C)\text{Posterior}(S,C)+(1-q(S,C))\text{Posterior}(S_{nearest}(S,C),C),$$

meaning with probability $0 < q(S,C) \leq 1$, the sample can be generated using Posterior(S,C), and with probability $(1-q(S,C))$, the sample can be generated using Posterior($S_{nearest}(S,C),C$).

In several embodiments, knowledge sharing can occur when (a) a relatively new content element (e.g., carousel) and/or a first content element does not have much information, such as an amount of information that is below the predetermined informational threshold and/or (b) another segment exists with similar content preferences that has information above the predetermined informational threshold. Knowledge sharing can occur per content element (e.g., carousel). For example, a segment, $S_1$ can borrow a portion or more of knowledge of content A, from another segment, segment $S_2$. However, for content B, $S_1$ has enough of content B, therefore depends on its own knowledge without using knowledge from segment $S_2$ for content B. Responsive to identifying that a nearest segment (e.g., segment $S_{nearest}(S,C)$) exists for another segment (e.g., the first segment), and determining that a knowledge sharing opportunity exists for the first segment and the second segment, information with similar content preferences can be shared from the nearest segment to the first segment.

In some embodiments, the mixture distributions can determine how much information to borrow from a first segment with another segment (e.g., second segment). In general, the parameter q(S,C) in the mixture distribution in (1) dictates how much information to borrow from $S_{nearest}(S,C)$. In several embodiments, an amount of information from the impression response data for the nearest segment for the first content element that can be used in the mixture distribution for the first segment for the first content element can be adapted based on an information parameter in the mixture distribution for the first segment for the first content element. In many embodiments, the information parameter, such as q, in the mixture distribution for the first segment for the first content element can be based on a variance of a posterior distribution of the first segment for the first content element.

In several embodiments, the parameter q can be defined as:

$$q(S, C) = \begin{cases} 1, \text{ if } \nexists S_{nearest}(S, C), \text{ otherwise} \\ \dfrac{\text{Maximum } V(\text{Posterior}(S, C)) \text{ allowed to meet the threshold}}{V(\text{Posterior}(S, C))} \end{cases}$$

where V (Posterior(S,C)) denotes the variance of the Posterior(S,C), and the present threshold is the predetermined informational threshold described above. An inverse relationship can be noted, as the amount of information increases, the posterior distribution variance decreases.

In many embodiments, the mixture distribution can be used when the amount of information in the posterior distribution is below a preset threshold, and the current variance of Posterior(S,C) is higher than the preset threshold. The parameter q can satisfy q(S,C)≤1, in order for the definition of the mixture distribution to be valid.

In conventional shared learning approaches, the information can include an entire set of features for each user that assumes a linear relationship between a reward function (e.g., a conversion rate for a carousel viewed as a function of user and/or context features) with the features. By using an entire set of features, such a large number of features used to describe a user and/or context can pose large scaling challenges. Some large scaling challenges can include information that no longer can assume a linear relationship between the reward function and the features required for conventional shared learning approaches. By aggregating users (e.g., contexts) into segments, the reward function can assume a linear relationship by reducing the large scaling challenges thereby allowing scaling of the information.

In many embodiments, the sharing techniques described herein can provide an improvement over the conventional shared learning approaches used for sharing learning across users and/or contexts, which can work even when the reward function and/or the features for the contexts form a non-linear relationship. In several embodiments, the sharing techniques described herein can provide an improvement over the conventional shared learning approaches by adapting the Thompson sampling approach to share learning between different segments to resolve the explore-exploit dilemma with dynamically shared learnings. By this approach, the shared learning can continue until enough information about a content element (e.g., carousel) for a segment is reached and/or when an amount of information meets or exceeds the predetermined informational threshold. In many embodiments, after receiving enough information about a content element and/or the an amount of information that meets or exceeds the predetermined informational threshold, the sharing techniques is no longer used for that content element, as more specific information is available for that content element. In some embodiments, knowledge sharing can be specific to a content element (e.g., carousel). For example, a first segment could use knowledge from another segment for a first content element (e.g., a first carousel), and rely its own information (without shared knowledge) for a second content element (e.g., a second carousel).

In a number of embodiments, method 800 additionally can include a block 808 of determining weightings of the content elements for the one or more first segments, based at least in part on the mixture distribution. In many embodiments, the weighting of the content elements can be determined by generating a random sample from the posterior distributions for each content element of the content elements, using the impression response data for the content elements, and using the mixture distributions for content elements in cases when the sharing has occurred.

In many embodiments, the weightings can be further determined based on the channel classification of the first user and the responses of the users in each of the two channels in the impression response data, as described further in block 405 (FIG. 4). In the same or other embodiments, the weightings for one or more segments can be further determined based at least in part on the impression response data being adjusted by a temporal decay factor, as described further in block 704 (FIG. 7).

In a number of embodiments, method 800 additionally can include a block 809 of selecting a selected content element. In many embodiments, selecting a selected content element can be from among the content elements based on the weightings of the content elements for the one or more first segments. Thompson sampling can be based on a user belonging to one or more segments (e.g., groups, contexts, and/or users) to separately run explore-exploit. In several embodiments, block 809 of selecting a selected content from among the content elements based on the weightings of the content elements for the one or more first segments can include selecting the selected content element from among the content elements, such that weighting of the selected content element is the maximum of the weightings, of the content elements. For example, each time an explore-exploit dilemma exists for a user and/or context belonging to a segment S, for each carousel C, a random sample w(S,C) can be generated from the posterior distribution of conversion rate of carousel C for the segment S, then the selected content element can be selected as follows:

Selected content element=argmax$_C$w(S,C)

An described above, an extension of this approach can be to choose more than one content element by choosing the top n content elements from a sorted list of w(C) in descending order.

In several embodiments, when the segments are overlapping, (e.g., a user and/or context can belong to multiple segments), Thompson sampling can be adapted as follows:

Selected content element=argmax$_C$ max$_{\{S_j:user/context \in S_j\}}$w($S_j$,C).

As an example, suppose there are three customer segments: $S_1$, $S_2$ and $S_3$, and there are three contents: $C_1$, $C_2$ and $C_3$. Assume all the contents were introduced last week. Suppose, for segment $S_1$ and content $C_1$, the prior click probability distribution is given by Beta(2,8). Next, assume there were ten impressions of $C_1$ shown to users belonging to segment $S_1$ and out of those impressions, one impression of the ten impressions received a response (e.g., a click). Therefore, the posterior distribution for the response (e.g., click) probability $P_{(S_1 C_1)}$, for ($S_1$, $C_1$) is given by:

Beta(2+1,8+(10−1))=Beta(3,17).

Similarly, posterior distributions for response (e.g., click) probability of (segment, content) pairs can be computed.

After the computation, the following response (e.g., click) probability posterior distributions for the (segment, content) pairs are as follows:

$P_{(S_1C_1)} \sim \text{Beta}(3,17)$, $P_{(S_1C_2)} \sim \text{Beta}(500,1500)$, $P_{(S_1C_3)} \sim \text{Beta}(202,1798)$, $P_{(S_2C_1)} \sim \text{Beta}(400,1600)$, $P_{(S_2C_2)} \sim \text{Beta}(200,1800)$, $P_{(S_2C_3)} \sim \text{Beta}(500,1500)$, $P_{(S_3C_1)} \sim \text{Beta}(300,1700)$, $P_{(S_3C_2)} \sim \text{Beta}(502,1498)$, $P_{(S_3C_3)} \sim \text{Beta}(200,1800)$, where $P_{(S,C)}$ denotes the click probability of segment S and content C.

The standard deviation of the posterior distribution can be set to be less than $10^{-2}$ for the segment not to borrow any knowledge from other segments.

The standard deviation of a Beta $(\alpha,\beta)$ distribution can be computed as $$Std = \sqrt{\frac{\alpha\beta}{(\alpha+\beta)^2(\alpha+\beta+1)}}.$$

With the threshold set as $10^{-2}$, $S_1$ does not have enough information for content $C_1$. So, $S_1$ can borrow information about $C_1$.

In many embodiments, $S_1$ does not borrow information on contents $C_2$ and $C_3$ and instead relies on its own information. Next, $S_{nearest}(S_1, C_1)$ can be found in order to determine which segment $S_1$ can borrow knowledge (e.g., information) from.

In order to find $S_{nearest}(S_1, C_1)$, first note than both $S_2$ and $S_3$ have enough information on $C_1$ (the standard deviation of $P_{(S_2,C_1)}$ and $P_{(S_3,C_1)}$ is less than $10^{-2}$).

Between $S_1$ and $S_2$, and contents $C_2$ and $C_3$, both segments $S_1$ and $S_2$ have enough information. The same is true between $S_1$ and $S_3$.

The mean of a Beta $(\alpha,\beta)$ distribution is given by:

$$E = \frac{\alpha}{\alpha+\beta}.$$

Therefore, the posterior means for the pairs are:

$E_{(S_1,C_2)}=0.250$, $E_{(S_1,C_3)}=0.101$, $E_{(S_2,C_2)}=0.100$, $E_{(S_2,C_3)}=0.250$, $E_{(S_3,C_2)}=0.251$, $E_{(S_3,C_3)}=0.100$.

Therefore, the correlation in posterior means of segments $S_1$ and $S_2$ is:

$$\text{Corr}(S_1, S_2) = \frac{\text{Cov}(S_1, S_2)}{\sqrt{\text{Var}_{S_1} \times \text{Var}_{S_2}}},$$

$$\text{Cov}(S_1, S_2) = \frac{1}{2}(E_{(S_1,C_2)} \times E_{(S_2,C_2)} + E_{(S_1,C_3)} \times E_{(S_2,C_3)}) - E_{S_1} \times E_{S_2},$$

$$E_{S_1} = \frac{1}{2}(E_{(S_1,C_2)} + E_{(S_1,C_3)}) = 0.1755,$$

$$E_{S_1} = \frac{1}{2}(E_{(S_2,C_2)} + E_{(S_2,C_3)}) = 0.1750,$$

$$\text{Var}_{S_1} = \frac{1}{2}((E_{(S_1,C_2)})^2 + (E_{(S_1,C_3)})^2) - (E_{S_1})^2 = 0.005550,$$

$$\text{Var}_{S_2} = \frac{1}{2}((E_{(S_2,C_2)})^2 + (E_{(S_2,C_3)})^2) - (E_{S_2})^2 = 0.005625,$$

Therefore, $\text{Corr}(S_1,S_2)=-1$.

Similarly, $\text{Corr}(S_1,S_3)=1$.

Therefore, $S_{nearest}(S_1,C_1)=S_3$.

Because $S_{nearest}(S_1,C_1)=S_3$ exists, $q(S_1,C_1)$ can be computed as follows:

$$q(S_1, C_1) = \frac{10^{-4}}{\text{Var}(P_{(S_1,C_1)})}$$

The variance of a Beta$(\alpha,\beta)$ distribution can be computed as follows:

$$Std = \frac{\alpha\beta}{(\alpha+\beta)^2(\alpha+\beta+1)}.$$

Therefore, $$\text{Var}(P_{(S_1,C_1)}) = \frac{3 \times 17}{(3+17)^2(3+17+1)} = 0.0061.$$

So, $$q(S_1, C_1) = \frac{1}{61}.$$

Finally, combining it all together, for generating a sample from click probability $P_{(S_1,C_1)}$ of (segment, content) pair $(S_1,C_1)$, (1) with probability $1/61$, a sample can be generated using the posterior distribution of $P_{(S_1,C_1)}$, and (2) with probability $60/61$, a sample can be generated using the posterior distribution of $P_{(S_3,C_1)}$. For the other (segment, content) pairs, samples can be generated using their own posterior distribution (as they meet the predetermined informational threshold).

Once the samples are generated, the Thompson sampling follows as usual, that is:

Chosen content=$\text{argmax}_C w(S,C)$, where $w(S,C)$ is the sample for the segment S and content C.

In a number of embodiments, method 800 additionally can include a block 810 of generating the webpage to comprise the selected content element. In many embodiments, the selected content element can be the selected content element selected in block 809. In several embodiments, the selected content element can be selected to resolve the explore-exploit decision by considering by the weightings of the content elements derived from posterior distributions using the impression response data representing the past performance of the content elements, and by including mixture distributions for sharing information for content elements in segments in which the amount of information does not meet the predetermined informational threshold.

Figure 6:
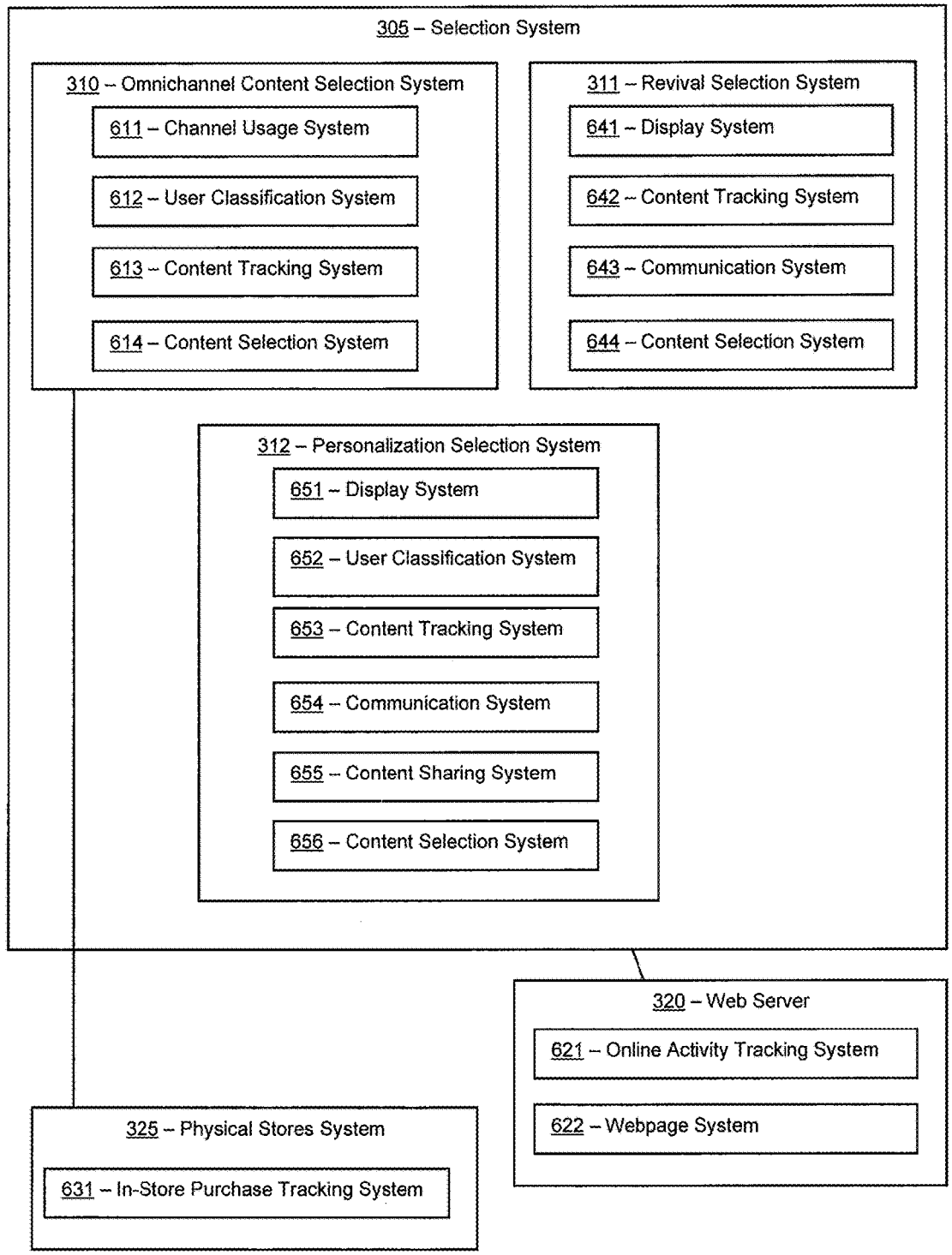
FIG. 6 illustrates a block diagram of the system of FIG. 3.

Turning back in the drawings, FIG. 6 illustrates a block diagram of system 300, according to the embodiment shown in FIG. 3. Omnichannel content selection system 310, revival selection system 311, personalization selection system 312, web server 320, and/or physical stores system 325 are merely exemplary and are not limited to the embodiments presented herein. Omnichannel content selection system 310, revival selection system 311, personalization selection system 312, web server 320, and/or physical stores system 325 can be employed in many different embodiments or examples not specifically depicted or described herein. In some embodiments, certain elements or systems of omnichannel content selection system 310, revival selection system 311, personalization selection system 312, web server 320, and/or physical stores system 325 can perform various procedures, processes, and/or acts. In other embodiments, the procedures, processes, and/or acts can be performed by other suitable elements or systems. In many embodiments, the systems of omnichannel content selection system 310, revival selection system 311, personalization selection system 312, web server 320, and/or physical stores system 325 can be modules of computing instructions (e.g., software modules) stored at non-transitory computer readable media. In other embodiments, the systems of omnichannel content selection system 310, revival selection system 311, personalization selection system 312, web server 320, and/or physical stores system 325 can be implemented in hardware.

In many embodiments, omnichannel content selection system 310 can include a channel usage system 611. In certain embodiments, channel usage system 611 can at least partially perform block 401 (FIG. 4) of tracking usage data for users using a first channel and a second channel. In many embodiments, channel usage system 611 can collect and/or perform linkages on information obtained from online activity tracking system 621 of web server 320 and in-store purchase tracking system 631 of physical stores system 325, as described below.

In a number of embodiments, omnichannel content selection system 310 can include a user classification system 612. In certain embodiments, user classification system 612 can at least partially perform block 402 (FIG. 4) of performing a classification of first users of the users into a first group and second users of the users into a second group.

In many of embodiments, omnichannel content selection system 310 can include a content tracking system 613. In certain embodiments, content tracking system 613 can at least partially perform block 403 (FIG. 4) of, for each impression of a content element of content elements being displayed on a website to a user of the users, tracking impression response data including (a) whether the user is grouped into the first group or the second group, and (b) response data including: (i) a first response by the user to the content element in the first channel, and (ii) a second response by the user to the content element in the second channel.

In a number of embodiments, omnichannel content selection system 310 can include a content selection system 614. In certain embodiments, content selection system 614 can at least partially perform block 405 (FIG. 4) of generating the webpage to include a selected content element from among the content elements, block 501 (FIG. 5) of generating a first random sample from a posterior distribution for a first channel conversion being performed for the each content element by users in the classification of the first user, based on the impression response data for the each content element, block 502 (FIG. 5) of generating a second random sample from a posterior distribution for a second channel conversion being performed for the each content element by users in the classification of the first user, based on the impression response data for the each content element, block 503 (FIG. 5) of determining a weighting for the each content element based on a maximum of the first random sample and the second random sample, and/or block 504 (FIG. 5) of selecting the selected content element from among the content elements such that the weighting of the selected content element is a maximum of the weightings of the content elements.

In a number of embodiments, web server 320 can include an online activity tracking system 621. In certain embodiments, online activity tracking system 621 can at least partially perform block 401 (FIG. 4) of tracking usage data for users using a first channel and a second channel, such as by tracking the usage data of the users on the website hosted by web server 320.

In many embodiments, web server 320 can include a webpage system 622. In certain embodiments, webpage system 622 can at least partially perform block 404 (FIG. 4) of receiving a request from a first user of the users to display a webpage of the website, and/or block 405 (FIG. 4) of generating the webpage to include a selected content element from among the content elements.

In many embodiments, physical stores system 325 can include an in-store purchase tracking system 631. In certain embodiments, in-store purchase tracking system 631 can at least partially perform block 401 (FIG. 4) of tracking usage data for users using a first channel and a second channel, such as by tracking the usage data of the users in the physical stores.

In several embodiments, revival selection system 311 can include a display system 641. In certain embodiments, display system 641 can at least partially perform block 701 (FIG. 7) of displaying content elements on one or more websites to users.

In many embodiments, revival selection system 311 can include a content tracking system 642. In certain embodiments, content tracking system 642 can at least partially perform block 702 (FIG. 7) of, for each impression of a content element of the content elements being displayed on the one or more websites to a user of the users, tracking impression response data comprising (a) a response of the user to the content element of the content elements displayed on the one or more websites and (b) a time of the response of the user. In many embodiments, content tracking system 642 can collect and/or track impression (e.g., response) data of content of users, such as, by tracking online activity tracking system 621 of webserver 320 and webpage system 622 of webserver 320.

In many embodiments, revival selection system 311 can include a communication system 643. In certain embodiments, communication system 643 can at least partially perform block 703 (FIG. 7) of receiving a request from a first user of the users to display a webpage of the one or more websites.

In many embodiments, revival selection system 311 can include a content selection system 644. In certain embodiments, content selection system 644 can at least partially perform block 704 (FIG. 7) of determining weightings of the content elements based on posterior distributions using the impression response data, as adjusted by a temporal decay factor based on the times of the impression response data, block 705 (FIG. 7) of selecting a selected content element from among the content elements based on the weightings of the content elements, and/or block 706 (FIG. 7) of generating the webpage to comprise the selected content element.

In many embodiments, personalization selection system 312 can include a display system 651. In several embodiments, display system 651 can at least partially perform block 801 (FIG. 8) of displaying content elements on one or more websites to users.

In many embodiments, personalization selection system 312 can include a user classification system 652. In many embodiments, user classification system 652 can at least partially perform block 802 (FIG. 8) of performing a classification of the users into segments. In many embodiments, user classification system 652 can classify the users based on information obtained from online activity tracking system 621 of webserver 320 and webpage system 622 of webserver 320.

In a number of embodiments, personalization selection system 312 can include a content tracking system 653. In several embodiments, content tracking system 653 can at least partially perform block 803 (FIG. 8) of, for each impression of a content element of the content elements being displayed on the one or more websites to a user of the users, tracking impression response data comprising (a) a response of the user to the content element of the content elements displayed on one or more websites, and (b) one or more segments of the segments in which the user is classified.

In several embodiments, personalization selection system 312 can include a communication system 654. In a number for embodiments, communication system 654 can at least partially perform block 804 (FIG. 8) of receiving a request from a first user of the users to display a webpage of the one or more websites, the first user being classified into one or more first segments.

In many embodiments, personalization selection system 312 can include a content sharing system 655. In certain embodiments, content sharing system 655 can at least partially perform block 805 (FIG. 8) of determining an amount of information in a posterior distribution of each of the one or more first segments for each of the content elements based on the impression response data, block 806 (FIG. 8) of determining a nearest segment to the first segment for the first content element, and/or block 807 (FIG. 8) of generating a mixture distribution for the first segment for the first content element based on the impression response data for the first segment for the first content element and the impression response data for the nearest segment for the first content element.

In several embodiments, personalization selection system 312 can include a content selection system 656. In certain embodiments, content selection system 656 can at least partially perform block 808 (FIG. 8) of determining weightings of the content elements for the one or more first segments, based at least in part on the mixture distributions, block 809 (FIG. 8) of selecting a selected content element from among the content elements based on the weightings of the content elements for the one or more first segments, and/or block 810 (FIG. 8) of generating the webpage to comprise the selected content element.

In many embodiments, the techniques described herein can provide several technological improvements. Specifically, the techniques described herein provide for automatically selecting content elements to resolve the explore-exploit decision in the context of the users and in view of an omnichannel setting. As described above, previous approaches that attempt to select content elements in view of the explore-exploit dilemma do not take into account the fact that different channels have different results, which leads to selections that are not as relevant to the users and are not as robust at exploiting effective content elements across the different channels. The techniques described herein thus provide an improvement in computer functionality beyond conventional approaches.

Moreover, the techniques described herein can run continuously to customize the selection of the content elements in view of the explore-exploit decision and to update the data used based on the impression results through each channel of the content elements displayed. In many embodiments, running these techniques continuously can provide, in real-time, content elements that are currently relevant to users, including new content elements. Moreover, the effectiveness and/or relevance of new content elements can be explored while exploiting content elements known to be effective/relevant to the users in a given context.

In many embodiments, the techniques described herein can be used continuously at a scale that cannot be handled using manual techniques. For example, the number of monthly visits to the website can exceed one hundred million, the number of registered users to the website can exceed ten million, and/or the number of content elements available for selection at any given time can exceed ten, twenty, fifty, a hundred, or even a thousand.

In a number of embodiments, the techniques described herein can solve a technical problem that arises only within the realm of computer networks, as the distinction between the offline and online channels does not exist outside the realm of computer networks. Moreover, the techniques described herein can solve a technical problem that cannot be solved outside the context of computer networks. Specifically, the omnichannel context selection techniques described herein cannot be used outside the context of computer networks, in view of a lack of data, and because the online channel that is part of the techniques described herein would not exist.

In several embodiments, the techniques described herein to resolve the explore-exploit decision in omnichannel settings can advantageously be applied and/or customized in various applications. For example, the techniques described herein can be applied for driving store conversion and/or other store metrics in addition to online conversion, or driving other metrics, through a principled automated technique that resolves together the explore-exploit dilemma and the dilemma about which metric to optimize at each opportunity. As another example, the techniques described herein can incorporate omnichannel considerations in making recommendations on webpages, adapting with the changing preferences of the users, whether it be online or in store, and seamlessly changing with the changing preferences of the users.

In many embodiments, the techniques described herein provide for automatically selecting content elements to resolve the explore-exploit decision in the context of the content preferences of users evolving over time to provide for revival. As described above, previous approaches that attempt to select content elements in view of the explore-exploit dilemma do not take into account the fact that a static environment and a dynamic environment have different results, which leads to selections that are not as relevant to the users and are not as robust at exploiting effective content elements across the different environments. The techniques described herein thus provide an improvement in computer functionality beyond conventional approaches.

Moreover, the techniques described herein can run continuously to customize the selection of the content elements in a dynamic environment in view of the explore-exploit decision and to update the data used based on the impression results and a decay parameter of the content elements displayed, to revive content elements that otherwise would have been effectively retired. In many embodiments, running these techniques continuously can provide, in real-time, content elements that are currently relevant to users, including revived content elements that have been effectively retired. Moreover, the effectiveness and/or relevance of new and/or effectively retired content elements can be explored while exploiting content elements known to be effective/relevant to the users in a given context.

In a number of embodiments, the techniques described herein can solve a technical problem that arises only within the realm of computer networks, as the distinction between the static environments and dynamic environments in online selection of content elements does not exist outside the realm of computer networks. Moreover, the techniques described herein to resolve the explore-exploit decision with revival can solve a technical problem that cannot be solved outside the context of computer networks. Specifically, the revival selection system techniques described herein cannot be used outside the context of computer networks, because reviving content in an evolving (e.g., dynamic) environment for an online selection of content elements would not exist.

In several embodiments, the techniques described herein to resolve the explore-exploit decision with revival can advantageously be applied and/or customized in various applications. As an example, the techniques described herein can incorporate revival of content considerations in making recommendations on webpages, adapting with the changing preferences of the users, and seamlessly changing with the changing preferences of the users.

In many embodiments, the techniques described herein provide for automatically selecting content elements to resolve the explore-exploit decision with personalization using dynamically shared learnings. As described above, previous approaches that attempt to select content elements in view of the explore-exploit dilemma, such as the fast contextual learning process and the customized contextual learning process described above, lead to selections that are not as relevant to the users and are not as robust at exploiting effective content elements across the different contextual learning processes. The techniques described herein thus provide an improvement in computer functionality beyond conventional approaches.

Moreover, the techniques described herein can run continuously to customize the selection of the content elements in a dynamic environment in view of the explore-exploit decision and to update the data used based on the impression results and knowledge sharing opportunities of the content elements displayed. In many embodiments, running these techniques continuously can provide, in real-time, content elements that are currently relevant to users, based on shared information. Moreover, the effectiveness and/or relevance of new content elements can be explored using shared information while exploiting content elements known to be effective/relevant to the users in a given context.

In a number of embodiments, the techniques described herein can solve a technical problem that arises only within the realm of computer networks, as the online impression data used in the information sharing does not existing outside the realm of computer networks. Moreover, the techniques described herein for personalization using dynamically shared learnings can solve a technical problem that cannot be solved outside the context of computer networks. Specifically, the personalization selection system techniques described herein cannot be used outside the context of computer networks, in view of a lack of data, and applying knowledge sharing opportunities for context that is part of the techniques described herein would not exist.

In several embodiments, the techniques described herein to resolve the explore-exploit decision with personalization using dynamically shared learnings can advantageously be applied and/or customized in various applications. As an example, the techniques described herein can incorporate knowledge sharing opportunities for content considerations in making recommendations on webpages, adapting with the changing preferences of the users, and seamlessly changing with the changing preferences of the users.

Various embodiments can include a system including one or more processors and one or more non-transitory computer-readable media storing computing instructions configured to run on the one more processors and perform certain acts. The acts can include tracking usage data for users using a first channel and a second channel. The acts also can include performing a classification of first users of the users into a first group and second users of the users into a second group. The classification can be based on the usage data. The acts additionally can include, for each impression of a content element of content elements being displayed on a website to a user of the users, tracking impression response data including (a) whether the user is grouped into the first group or the second group, and (b) response data including: (i) a first response by the user to the content element in the first channel, and (ii) a second response by the user to the content element in the second channel. The acts further can include receiving a request from a first user of the users to display a webpage of the website. The acts additionally can include generating the webpage to include a selected content element from among the content elements. The selected content element can be selected based on the classification of the first user and the impression response data for the content elements.

A number of embodiments can include a method being implemented via execution of computing instructions configured to run at one or more processors and stored at one or more non-transitory computer-readable media. The method can include tracking usage data for users using a first channel and a second channel. The method also can include performing a classification of first users of the users into a first group and second users of the users into a second group. The classification can be based on the usage data. The method additionally can include, for each impression of a content element of content elements being displayed on a website to a user of the users, tracking impression response data including (a) whether the user is grouped into the first group or the second group, and (b) response data including: (i) a first response by the user to the content element in the first channel, and (ii) a second response by the user to the content element in the second channel. The method further can include receiving a request from a first user of the users to display a webpage of the website. The method additionally can include generating the webpage to include a selected content element from among the content elements. The selected content element can be selected based on the classification of the first user and the impression response data for the content elements.

Several embodiments can include a system including one or more processors and one or more non-transitory computer-readable media storing computing instructions configured to run on the one more processors and perform certain acts. The acts can include displaying content elements on one or more websites to users. The acts can also include for each impression of a content element of the content elements being displayed on the one or more websites to a user of the users. Tracking impression response data can include (a) a response of the user to the content element of the content elements displayed on the one or more websites and (b) a time of the response of the user. The acts can further include receiving a request from a first user of the users to display a webpage of the one or more websites. Displaying a webpage can include determining weightings of the content elements based on posterior distributions using the impression response data. The impression response data can be adjusted by a temporal decay factor based on the times of the impression response data. The acts can include selecting a selected content element from among the content elements based on the weightings of the content elements. Selecting the selected content can include generating a webpage to include the selected content element.

Many embodiments can include a method being implemented via execution of computing instructions configured to run at one or more processors and stored at one or more non-transitory computer-readable media. The method can include displaying content elements on one or more websites to users. For each impression of a content element of the content elements being displayed on the one or more web sites to a user of the users, the method can include tracking impression response data. The impression response data can include (a) a response of the user to the content element of the content elements displayed on the one or more web sites and (b) a time of the response of the user. The method can include receiving a request from a first user of the users to display a webpage of the one or more websites. Displaying a webpage can include determining weightings of the content elements based on posterior distributions using the impression response data. The impression response data can be adjusted by a temporal decay factor based on the times of the impression response data. The method can include selecting a selected content element from among the content elements based on the weightings of the content elements. The method can include generating the webpage to comprise the selected content element.

Various embodiments can include a system including one or more processors and one or more non-transitory computer-readable media storing computing instructions configured to run on the one more processors and perform certain acts. The acts can include displaying content elements on one or more websites to users. The acts can further include performing a classification of the users into segments, each of the users being classified into one or more segments of the segments. For each impression of a content element of the content elements being displayed on the one or more websites to a user of the users, the acts can include tracking impression response data comprising (a) a response of the user to the content element of the content elements displayed on the one or more websites, and (b) one or more segments of the segments in which the user is classified. The acts can include receiving a request from a first user of the users to display a webpage of the one or more websites. The first user can be classified into one or more first segments of the segments. The acts can further include determining an amount of information in a posterior distribution of each of the one or more first segments for each of the content elements based on the impression response data. For each first segment of the one or more first segments and each first content element of the content elements in which the amount of information for the first segment for the first content element can be below a predetermined informational threshold. The acts can perform determining a nearest segment to the first segment for the first content element. The acts can perform generating a mixture distribution for the first segment for the first content element based on the impression response data for the first segment for the first content element and the impression response data for the nearest segment for the first content element. The acts can additionally perform determining weightings of the content elements for the one or more first segments, based at least in part on the mixture distributions. The acts can perform selecting a selected content element from among the content elements based on the weightings of the content elements for the one or more first segments. Based on the weightings of the content elements for the one or more first segments, the acts can perform generating the webpage to comprise the selected content element.

In a number of embodiments can include a method being implemented via execution of computing instructions configured to run at one or more processors and stored at one or more non-transitory computer-readable media. The method can include displaying content elements on one or more websites to users. The method can include performing a classification of the users into segments, each of the users being classified into one or more segments of the segments. For each impression of a content element of the content elements being displayed on the one or more websites to a user of the users, the method can be tracking impression response data comprising (a) a response of the user to the content element of the content elements displayed on the one or more websites, and (b) one or more segments of the segments in which the user is classified. The method can be receiving a request from a first user of the users to display a webpage of the one or more websites, the first user being classified into one or more first segments of the segments. The method can further be determining an amount of information in a posterior distribution of each of the one or more first segments for each of the content elements based on the impression response data. For each first segment of the one or more first segments and each first content element of the content elements in which the amount of information for the first segment for the first content element is below a predetermined informational threshold, the method can be determining a nearest segment to the first segment for the first content element. Additionally, the method can be generating a mixture distribution for the first segment for the first content element based on the impression response data for the first segment for the first content element. The method can also be based on the impression response data for the nearest segment for the first content element. The method can be determining weightings of the content elements for the one or more first segments, based at least in part on the mixture distributions. The method can be selecting a selected content element from among the content elements based on the weightings of the content elements for the one or more first segments. Further, the method can be generating the webpage to comprise the selected content element.

Although automatic resolution of the explore-exploit decision in omnichannel settings, with revival, and/or with personalization using dynamically shared learnings has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-8 may be modified, and that the foregoing discussion of certain of these embodiments does not necessarily represent a complete description of all possible embodiments. For example, one or more of the procedures, processes, or activities of FIGS. 4-5 and 7-8 may include different procedures, processes, and/or activities and be performed by many different modules, in many different orders, and/or one or more of the procedures, processes, or activities of FIGS. 4-5 and 7-8 may include one or more of the procedures, processes, or activities of another different one of FIGS. 4-5 and 7-8. As another example, the systems within selection system 305, omnichannel content selection system 310, revival selection system 311, personalization system 312, web server 320, and/or physical stores system 325 in FIG. 6 can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions configured to run on the one or more processors and perform:
displaying content elements on one or more websites to users;
for each impression of a content element of the content elements being displayed on the one or more websites to a user of the users, tracking respective impression response data comprising (a) a respective response of the user to the content element of the content elements displayed on the one or more websites and (b) a respective time of the respective response of the user;
receiving a request from a first user of the users to display a webpage of the one or more websites;
determining weightings of the content elements based on posterior distributions using the respective impression response data, as adjusted by a temporal decay factor based on the respective times of the respective impression response data for the content elements;
selecting a selected content element from among the content elements based on the weightings of the content elements; and
generating the webpage to comprise the selected content element.

2. The system of claim 1, wherein determining the weightings of the content elements further comprises:
generating a respective random sample from a respective posterior distribution of the posterior distributions for each content element of the content elements, using the respective impression response data, as adjusted by the temporal decay factor based on the respective time of the respective impression response data for the each content element.

3. The system of claim 1, wherein:
the respective impression response data tracks conversion rate of the content elements by the users.

4. The system of claim 1, wherein selecting the selected content element comprises:
determining a maximum of the weightings of the content elements; and
selecting the selected content element from among the content elements such that a weighting of the selected content element is the maximum of the weightings of the content elements.

5. The system of claim 1, wherein:
the temporal decay factor is adapted based on changes in the respective impression response data using a correlation computation.

6. The system of claim 5, wherein:
the temporal decay factor is further adapted differently based on different content element classes of the content elements.

7. The system of claim 1, wherein:
the respective times of the respective impression response data are tracked on a weekly basis; and
the temporal decay factor is applied to adjust the respective impression response data on a weekly basis when the weightings of the content elements are determined.

8. The system of claim 1, wherein :
each of the users is assigned a respective classification;
the respective impression response data further comprises, for each impression of the content element, (a) the respective classification of the user of the users, and (b) a respective response of the user in each of two channels; and
the weightings are further determined based on the respective classification of the first user and respective responses of the users in each of the two channels in the respective impression response data.

9. The system of claim 1, further comprises:
determining a respective performance of each content element of the content elements on one or more websites to users in combination with personalization content selection techniques to determine a respective probability of selecting the each content element of the content elements.

10. The system of claim 9, further comprises:
determining a respective performance of each content element of the content elements on one or more websites to users in combination with both omnichannel content selection techniques and personalization content selection techniques to determine the respective probability of selecting the each content element of the content elements.

11. A method being implemented via execution of computing instructions configured to run at one or more processors and stored at one or more non-transitory computer-readable media, the method comprising:
displaying content elements on one or more websites to users;
for each impression of a content element of the content elements being displayed on the one or more websites to a user of the users, tracking respective impression response data comprising (a) a respective response of the user to the content element of the content elements displayed on the one or more websites and (b) a respective time of the respective response of the user;

receiving a request from a first user of the users to display a webpage of the one or more websites;

determining weightings of the content elements based on posterior distributions using the respective impression response data, as adjusted by a temporal decay factor based on the respective times of the respective impression response data for the content elements;

selecting a selected content element from among the content elements based on the weightings of the content elements; and generating the webpage to comprise the selected content element.

12. The method of claim 11, wherein determining the weightings of the content elements further comprises:

generating a respective random sample from a respective posterior distribution of the posterior distributions for each content element of the content elements, using the respective impression response data, as adjusted by the temporal decay factor based on the respective time of the respective impression response data for the each content element.

13. The method of claim 11, wherein:

the respective impression response data tracks conversion rate of the content elements by the users.

14. The method of claim 11, wherein selecting the selected content element comprises:

determining a maximum of the weightings of the content elements; and selecting the selected content element from among the content elements such that a weighting of the selected content element is the maximum of the weightings of the content elements.

15. The method of claim 11, wherein:

the temporal decay factor is adapted based on changes in the respective impression response data using a correlation computation.

16. The method of claim 15, wherein:

the temporal decay factor is further adapted differently based on different content element classes of the content elements.

17. The method of claim 11, wherein:

the respective times of the respective impression response data are tracked on a weekly basis; and the temporal decay factor is applied to adjust the respective impression response data on a weekly basis when the weightings of the content elements are determined.

18. The method of claim 11, wherein:

each of the users is assigned a respective channel classification;

the respective impression response data further comprises, for each impression of the content element, (a) the respective channel classification of the user of the users, and (b) a respective response of the user in each of two channels; and the weightings are further determined based on the respective channel classification of the first user and respective responses of the users in each of the two channels in the respective impression response data.

19. The method of claim 11, wherein:

the users are classified into respective segments;

the respective impression response data further comprises, for each impression of the content element, one or more respective segments of the segments in which the user is classified; and the weightings for one or more respective segments are further determined based at least in part on a mixture distribution based on the respective impression response data for a nearest segment for one of the content elements for a respective segment in which the first user is classified.

20. The method of claim 19, wherein:

each of the users is assigned a respective channel classification;

the respective impression response data further comprises, for each impression of the content element, (a) the respective channel classification of the user of the users, and (b) respective responses of the user in each of two channels; and the weightings are further determined based on the respective channel classification of the first user and the respective responses of the users in each of the two channels in the respective impression response data.

* * * * *